(12) United States Patent
Gholmieh et al.

(45) Date of Patent: Mar. 24, 2020

(10) Patent No.: US 10,601,710 B2

(54) IP LEVEL MULTIPATH PROTOCOL

(71) Applicant: QUALCOMM Incorporated, San Diego, CA (US)

(72) Inventors: Ralph Akram Gholmieh, San Diego, CA (US); Susheel Kumar Yadav Yadagiri, San Diego, CA (US); Vaibhav Kumar, Encinitas, CA (US); Sanjay Vishin, Sunnyvale, CA (US); Siddharth Chitnis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 15/907,688

(22) Filed: Feb. 28, 2018

(65) Prior Publication Data

US 2018/0270150 A1 Sep. 20, 2018

Related U.S. Application Data

(60) Provisional application No. 62/471,797, filed on Mar. 15, 2017, provisional application No. 62/584,721, filed on Nov. 10, 2017.

(51) Int. Cl.
*H04L 12/741* (2013.01)
*H04L 29/06* (2006.01)
(Continued)

(52) U.S. Cl.
CPC .......... *H04L 45/74* (2013.01); *H04L 61/2007* (2013.01); *H04L 61/2592* (2013.01);
(Continued)

(58) Field of Classification Search
CPC ....... H04L 45/74; H04L 69/16; H04L 69/324; H04L 67/12; H04L 61/2592;
(Continued)

(56) References Cited

U.S. PATENT DOCUMENTS 5,432,754 A 7/1995 Brady et al.
7,406,082 B2 * 7/2008 Nagarajan ............... H04L 45/00
370/394
(Continued)

OTHER PUBLICATIONS

International Search Report and Written Opinion—PCT/US2018/020388—ISA/EPO—dated Jun. 22, 2018. 13 pages.

*Primary Examiner* — Ajay Cattungal
(74) *Attorney, Agent, or Firm* — The Marbury Law Group, PLLC

(57) ABSTRACT

Systems, methods, and devices of the various embodiments provide for multipath transport of Internet Protocol (IP) packets by an in-vehicle computing device, such as a vehicle's autonomous driving system, vehicle's telematics unit, vehicle's control system, etc. In various embodiments, IP packets may be extended to include tracking information. In various embodiments, the tracking information may include sequence numbers, sender reports, receiver reports, version indications, and/or length indications. In various embodiments, IP packets may be extended to include tracking information by a centralized scheduler for an in-vehicle computing device including a plurality of modems and/or a destination computing device.

29 Claims, 22 Drawing Sheets

(51) Int. Cl.
*H04L 29/08* (2006.01)
*H04L 29/12* (2006.01)
*H04W 4/44* (2018.01)
*H04Q 9/00* (2006.01)
*H04L 12/801* (2013.01)

(52) U.S. Cl.
CPC ............ *H04L 67/025* (2013.01); *H04L 67/12* (2013.01); *H04L 67/14* (2013.01); *H04L 67/16* (2013.01); *H04L 67/22* (2013.01); *H04L 67/32* (2013.01); *H04L 67/42* (2013.01); *H04L 69/16* (2013.01); *H04L 69/22* (2013.01); *H04L 69/324* (2013.01); *H04W 4/44* (2018.02); *H04L 47/34* (2013.01); *H04L 63/0272* (2013.01); *H04L 63/164* (2013.01); *H04Q 9/00* (2013.01)

(58) Field of Classification Search
CPC ..... H04L 61/2007; H04L 69/22; H04L 67/16; H04L 67/32; H04L 67/025; H04L 67/14; H04L 67/22; H04L 67/42; H04L 63/164; H04L 63/0272; H04L 47/34; H04W 4/44; H04Q 9/00
See application file for complete search history.

(56) References Cited

U.S. PATENT DOCUMENTS

| | | | |
|---|---|---|---|
| 8,601,150 B1 | 12/2013 | Portell et al. | |
| 9,083,581 B1* | 7/2015 | Addepalli | H04W 72/0406 |
| 9,509,507 B1 | 11/2016 | Hunt et al. | |
| 2005/0185621 A1* | 8/2005 | Sivakumar | H04L 1/1887 370/335 |
| 2006/0171365 A1* | 8/2006 | Borella | H04L 12/4633 370/338 |
| 2009/0285114 A1* | 11/2009 | Uchida | H04W 74/00 370/252 |
| 2009/0296685 A1* | 12/2009 | O'Shea | H04L 69/32 370/351 |
| 2010/0027419 A1* | 2/2010 | Padhye | H04L 5/0037 370/235 |
| 2010/0046430 A1* | 2/2010 | Naito | H04L 45/22 370/328 |
| 2010/0165985 A1* | 7/2010 | Sharma | H04L 47/10 370/389 |
| 2016/0119163 A1* | 4/2016 | Fadeev | H04L 12/6418 370/328 |
| 2016/0164619 A1 | 6/2016 | Sennett et al. | |
| 2016/0323715 A1 | 11/2016 | Leroux et al. | |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=0|0|P| C1| Len=6 |PthID|HT=0|   Overall sequence number    |
+-+-+-+-+-+-+-+-+-+-+-+-+-+-+-+-+-+-+-+-+-+-+-+-+-+-+-+-+-+-+-+-+
|               Path Sequence Number                           |
+-+-+-+-+-+-+-+-+-+-+-+-+-+-+-+-+-+-+-+-+-+-+-+-+-+-+-+-+-+-+-+-+
```

FIG. 8A

```
                     1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Last 2 bytes of packet payload|   overall sequence number     |
+-+-+-+-+-+-+-+-+-+-+-+-+-+-+-+-+-+-+-+-+-+-+-+-+-+-+-+-+-+-+-+-+
|     Path Sequence Number      |V=0|0|P| C1| Len=6 |PthID|HT=0 |
+-+-+-+-+-+-+-+-+-+-+-+-+-+-+-+-+-+-+-+-+-+-+-+-+-+-+-+-+-+-+-+-+
```

FIG. 8B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Overall Sequence number start | Overall Sequence number at end|
+-+-+-+-+-+-+-+-+-+-+-+-+-+-+-+-+-+-+-+-+-+-+-+-+-+-+-+-+-+-+-+-+
| Path Sequence number start   | Path Sequence number at end   |
+-+-+-+-+-+-+-+-+-+-+-+-+-+-+-+-+-+-+-+-+-+-+-+-+-+-+-+-+-+-+-+-+
| Number of Lost Packets       | Number of Out of Order Packets|
+-+-+-+-+-+-+-+-+-+-+-+-+-+-+-+-+-+-+-+-+-+-+-+-+-+-+-+-+-+-+-+-+
|     64 Bit UTC Timestamp of Last Received SenderReport        |
|                                                               |
+-+-+-+-+-+-+-+-+-+-+-+-+-+-+-+-+-+-+-+-+-+-+-+-+-+-+-+-+-+-+-+-+
|Elapsed time since last received SenderReport in Micro Seconds |
+-+-+-+-+-+-+-+-+-+-+-+-+-+-+-+-+-+-+-+-+-+-+-+-+-+-+-+-+-+-+-+-+
|             Last Sender Report ID                             |
+-+-+-+-+-+-+-+-+-+-+-+-+-+-+-+-+-+-+-+-+-+-+-+-+-+-+-+-+-+-+-+-+
```

906

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Last 2 bytes of Report       |V=01010| Cl| Len=2 |PthID|HT=2 |
+-+-+-+-+-+-+-+-+-+-+-+-+-+-+-+-+-+-+-+-+-+-+-+-+-+-+-+-+-+-+-+-+
```

IP LEVEL MULTIPATH PROTOCOL

RELATED APPLICATIONS

This application claims the benefit of priority to U.S. Provisional Patent Application 62/471,797 entitled "IP Level Multipath Protocol," filed Mar. 15, 2017 and to U.S. Provisional Patent Application 62/584,721 entitled "IP Level Multipath Protocol," filed Nov. 10, 2017. The entire contents of both applications are hereby incorporated by reference for all purposes.

BACKGROUND

Vehicles, such as driverless cars, may include systems, such as sensors, cameras, etc., that generate data that can be sent to other devices remote from the vehicle, such as a remote computing device, remote servers, other vehicles, etc. Additionally, vehicles, such as driverless cars, can receive data from other devices remote from the vehicle, such as remote computing device, remote servers, other vehicles, etc. Such generated and/or received data may be used by the vehicle and/or the other devices remote from the vehicle to support operations of the vehicle, other vehicles, support systems, traffic management, etc.

As an example, autonomous and semi-autonomous vehicles, such as driverless cars, can operate autonomously in many situations. Sensors, cameras, and other systems of the vehicle may provide inputs to the vehicle's control system that enable the control system to operate the vehicle autonomously. However, in some situations an autonomous or semi-autonomous vehicle may not be able to effectively operate autonomously, and remote teleoperation of the vehicle may be beneficial in those scenarios, even for just a short period of time. Communicating the sensor inputs received by the vehicle's control system to the remote teleoperator may enable the remote teleoperator to manually operate or guide the vehicle through the situation

SUMMARY

The systems, methods, and devices of the various embodiments provide for multipath transport of Internet Protocol (IP) packets by a computing device including a plurality of modems. Various embodiments may provide for multipath transport of IP packets by an in-vehicle computing device, such as a control system for an autonomous or semi-autonomous car. In various embodiments, IP packets may be extended to include tracking information, which may include sequence numbers, sender reports, receiver reports, version indications, and/or length indications. In various embodiments, IP packets may be extended to include tracking information by a centralized scheduler for a computing device including a plurality of modems and/or a destination computing device. In various embodiments, a centralized scheduler for a computing device may assign IP packets for transport to a plurality of modems based at least in part on delivery delays associated with the plurality of modems. In various embodiments, delivery delays may be determined based on one or more of queue sizes of the plurality of modems, delivery rate estimates of the plurality of modems, and end-to-end delay estimates. In some embodiments, the centralized scheduler may further assign IP packets for transport based on delivery delays and path priorities associated with the plurality of modems. In some embodiments, a centralized scheduler may adjust media generation rates based on available bandwidth. In some embodiments, a centralized scheduler may adjust delivery rate estimates of one or more of the plurality of modems based on error detections.

Various embodiments include methods that may be implemented in an IP level scheduler running on a processor of an in-vehicle computing device for IP transmission from a vehicle. Various embodiments may include receiving an IP packet at the IP level scheduler, ip level scheduler adding tracking information to the IP packet at the IP level scheduler, and sending the IP packet with the tracking information to a destination computing device. In some embodiments, adding tracking information to the IP packet at the IP level scheduler may include adding a trailer including the tracking information. Such embodiments may include updating a checksum of the IP packet in response to adding the trailer.

In some embodiments, adding tracking information to the IP packet at the IP level scheduler may include adding a header including tracking information. In such embodiments, the header may be added within an IP/User Datagram Protocol (UDP) packet such that the IP/UDP packet encapsulates both the header and the IP packet. In such embodiments, the header may be added as part of an extended Generic Routing Encapsulation (GRE) header within an encapsulating IP packet such that the encapsulating IP packet encapsulates both the extended GRE header and the IP packet.

In some embodiments, the tracking information may be an overall sequence number and a path sequence number. In some embodiments, the tracking information may be one or more of a class indicator, length indication, payload type indication, a path identifier, and a sender report.

Some embodiments may further include generating a control packet including control information, encapsulating the control packet using a same encapsulation mechanism as used for the IP packet, and sending the encapsulated control packet to the destination computing device. In such embodiments, the control information is one or more of a ping report, a sender report, and a receiver report for a path.

Some embodiments may further include receiving another IP packet including additional tracking information. In such embodiments, the additional tracking information may be a sender report including one or more of a number of sent packets on a path and sequence numbers sent on the path. In such embodiments, the additional tracking information may be a receiver report including one or more of a number of lost packets, a number of out of order packets, a Coordinated Universal Time (UTC) timestamp of a receiving time of a last received sender report, and a delay from reception of the last received sender report to generation of a current sender report at a device generating the current sender report.

Some embodiments may further include determining delivery delays associated with a plurality of modems. In such embodiments, the delivery delays may be determined based at least in part on delivery rate estimate and queue size reporting from each of the plurality of modems. In such embodiments, the delivery delays may be further determined based on end-to-end delay estimates for each end-to-end delivery path originating at each modem.

Some embodiments may further include adjusting delivery rate estimates of one or more of the plurality of modems based on an end-to-end error detection mechanism. In such embodiments, the end-to-end error detection mechanism may be implemented based at least in part using a sender report and a receiver report.

In some embodiments, the plurality of modems may be three or more modems. In various embodiments, the destination computing device may be remote from the vehicle.

Further embodiments may include an in-vehicle computing device having a processor configured with processor executable instructions to perform operations of any of the methods summarized above. Further embodiments may include in-vehicle computing device having means for performing functions of any of the methods summarized above. Further embodiments may include non-transitory processor-readable media on which are stored processor-executable instructions configured to cause a processor of an in-vehicle computing device to perform operations of any of the methods summarized above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 8A and 8B illustrate example schemas for appended packet tracking information to packets according to various embodiments.

FIG. 9B illustrates example receiver report tracking information according to various embodiments.

DETAILED DESCRIPTION

Figure 1A:
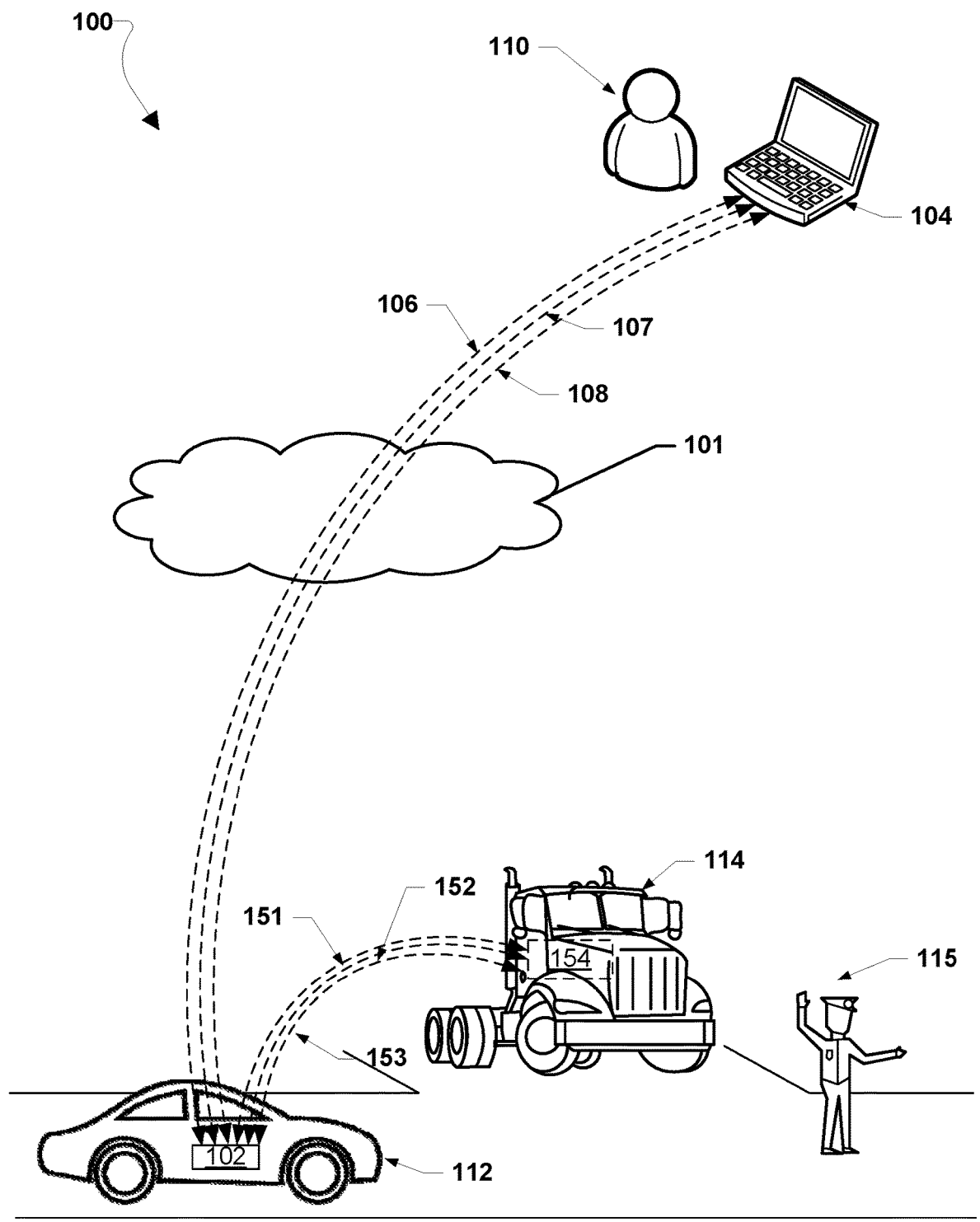
FIG. 1A is a system block diagram illustrating a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU® or CHROMECAST® or FIRE TV™), smart televisions, digital video recorders (DVRs), and similar personal electronic devices which include a programmable processor and memory and circuitry for sending and/or receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

Vehicles, such as driverless cars, can include systems, such as sensors, cameras, etc., that can generate data that can be sent to other devices remote from the vehicle, such as remote computing device, other vehicles, etc. Additionally, vehicles, such as driverless cars, can receive data from other devices remote from the vehicle, such as remote computing device, other vehicles, etc. Such generated and/or received data can be used by the vehicle and/or the other devices remote from the vehicle to support operation of the vehicle.

As one example, vehicles, such as driverless cars, can operate autonomously in many situations. Sensors, cameras, and other systems of the vehicle can provide inputs to the vehicle's control system and the control system can operate the vehicle autonomously based on the provided inputs. However, in some scenarios the vehicle might not be able to effectively operate autonomously, and remote teleoperation of the vehicle, even for just a short period of time, may be beneficial in those scenarios. By providing the inputs received by the vehicle's control system to the remote teleoperator, the remote teleoperator can manually operate or guide the vehicle through the scenario.

Vehicles, such as driverless cars, may include one or more systems, such as sensors, cameras, etc., that can generate data and/or can include one or more systems that can benefit from data received from devices remote from the vehicles, such as mapping systems, remote teleoperation systems, etc. The transport of the data generated by the vehicle and/or the data received by the vehicle over any given delivery path, such as a Long Term Evolution (LTE) pathway, Wi-Fi pathway, etc., may be limited by the capabilities (e.g., bandwidth, latency, reliability, cost, etc.) of that given delivery path. Thus, while transport of data to and from vehicles like driverless cars can be beneficial, current single path communication systems may not have the capabilities (e.g., bandwidth, latency, reliability, cost, etc.) in a single path to meet the needs for data transport of such vehicles under some circumstances.

One example of a scenario in which data transport is needed for autonomous and semi-autonomous vehicles, such as driverless cars, is remote teleoperation. Remote teleoperation of driverless cars, self-driving cars, or any other type of autonomous or semi-autonomous vehicle requires both the inputs received by the vehicle's control system to be provided to a computing device of the remote teleoperator and the commands from the remote teleoperator's computing device to be provided to the vehicle's control system in essentially real time (or near real time). Reliable and real time/near real time communications of data is required to enable a remote teleoperator successfully and safely navigate the vehicle through time-critical situations, such as a traffic control scenario, an accident situation, a vehicle malfunction condition, or any other type scenario or condition necessitating remote teleoperation of the vehicle. While limited remote teleoperation of vehicles can be beneficial, current communication systems may not meet the latency requirements or the reliability requirements to support safe teleoperation of a vehicle, particularly when several vehicles may be in the same situation (e.g., in a traffic accident situation).

Another example of a scenario in which reliable, near real time data transport is needed for vehicles, such as driverless cars, is car-to-car mapping. In car-to-car mapping, a vehicle may generate a local map (or picture) of vehicles and objects around the vehicle. For example, using LIDAR or RADAR, a computing device within the vehicle may generate a map of the space around the vehicle. The computing device within the vehicle may then share that map with other vehicles, such as other driverless cars, enabling such other vehicles can to the map to update and/or generate their own respective maps. While such map sharing can be beneficial, current communication systems do not meet the bandwidth requirements at a reasonable cost to support car-to-car mapping.

Further examples of scenarios in which reliable, near real time data transport is needed for vehicles, such as driverless cars, include: transport of on-vehicle sensor data, e.g., tachometers, accelerometers, etc., to remote vehicle diagnostic services; transport of vehicle camera images to other vehicles to alert such other vehicles of traffic patterns; and transport of sensor data or camera images to other vehicles or traffic monitoring services to report the status of traffic control equipment (e.g., whether a traffic light is green or red, whether a traffic light is working or disabled, the posted speed limit for a road as indicated by a highway sign, etc.). Scenarios in which reliable, near real time data transport is needed for vehicles, such as driverless cars, may be intermittent scenarios, such as scenarios that may have a limited duration (e.g., remote teleoperation, etc.) and/or ongoing scenarios, such as scenarios that are always occurring (e.g., do not end) during operation of the vehicle (e.g., transport of on-vehicle sensor data, etc.). While such data transport can be beneficial, current communication systems do not meet bandwidth, latency, reliability, and/or cost requirements to make such data transport worthwhile and/or effective.

Various embodiments may provide for multipath transport of Internet Protocol ("IP") packets by a computing device including a plurality of modems. Various embodiments may provide for multipath transport of IP packets by an in-vehicle computing device, such as vehicle's autonomous driving system, vehicle's telematics unit, vehicle's control system, etc. In various embodiments, IP packets may be extended to include tracking information. Such tracking information may include sequence numbers, sender reports, receiver reports, version indications, and/or length indications. In various embodiments, IP packets may be extended to include tracking information by the centralized scheduler, such as an Internet Protocol ("IP") level scheduler, for a computing device, for a computing device including a plurality of modems and/or a destination computing device. In various embodiments, a checksum for IP packet headers in which the tracking information is added may be modified based on the added tracking information.

Various embodiments may provide a centralized scheduler for a computing device, such as an IP level scheduler for a computing device. In various embodiments, a scheduler running on a processor of a computing device, may allocate packets for IP streams for transport to a plurality of modems, such as two, three, four, or more modems. For example, the IP streams for transport may be media streams received from encoders outputting IP packets. In various embodiments, IP packets may be extended to include tracking information by the centralized scheduler.

In various embodiments, the centralized scheduler, such as an IP level scheduler, may receive indications of per path statistics for delivery paths associated with each available modem. In various embodiments, a scheduler may receive per path statistics through the modem control (MC) (or modem notification (MN)) interface. In various embodiments, modems may provide their available rates and queue sizes through the MC (or MN) interface.

In various embodiments, a centralized scheduler, such as an IP level scheduler, for a computing device may assign IP packets for transport to a plurality of modems, such as two, three, four, or more modems, based at least in part on delivery delays associated with the plurality of modems. In various embodiments, as an IP packet for transport is received, the scheduler may determine a delivery delay for each of the plurality of modems, and may assign the IP packet to one of the plurality of modems based at least in part on the determined delivery delays. For example, the scheduler may assign the IP packet to the modem of the plurality of modems having the lowest determined delivery delay.

In various embodiments, delivery delays may be determined based on one or more of queue sizes of the plurality of modems, delivery rate estimates of the plurality of modems, and end-to-end delay estimates. In various embodiments, the scheduler may further assign packets for transport based on delivery delays and path priorities associated with the plurality of modems. In various embodiments, the scheduler may further assign packets for transport based on computing resource pool priorities. In various embodiments, a centralized scheduler, such as an IP level scheduler, for a computing device may adjust delivery rate estimates of one or more of the plurality of modems based on error detections. In some embodiments, an end-to-end error detection mechanism may be implemented based at least in part using a sender report and a receiver report.

In various embodiments, a centralized scheduler, such as an IP level scheduler, for a computing device may adjust media generation rates based on available bandwidth. In various embodiments, adjustments made to the media generation rate by the computing device may include distributing bandwidth across various media streams and/or prioritizing media streams.

Various examples of different applications/clients, middleware, layers, stacks, radio technologies, and transport protocols are discussed herein, specifically, Internet Protocol (IP), Transmission Control Protocol (TCP), User Datagram Protocol (UDP), Long Term Evolution (LTE), cellular vehicle-to-everything (V2X), Wireless Gigabit (WiGig), and/or ANT. The discussions of IP, TCP, UDP, LTE, V2X, WiGig, and ANT are provided merely as examples to better illustrate the aspects of the various embodiments, and are not intended to limit the scope of the disclosure or the claims in any way. Other applications/clients, middleware, layers, stacks, radio technologies, and transport protocols may be used with the various embodiments, and the other applications/clients, middleware, layers, stacks, radio technologies, and transport protocols may be substituted in the various examples without departing from the spirit or scope of the invention.

FIG. 1A is a system block diagram illustrating a network 100, such as a remote teleoperator network for a vehicle 112, suitable for use with various embodiments. The vehicle 112 may be any type of vehicle, such as an autonomous vehicle (e.g., driverless car, etc.), semi-autonomous vehicle, remotely operated vehicle, etc. The vehicle 112 may be configured to be operated remotely for a period of time by a remote teleoperator 110 using his or her remote teleoperator computing device 104.

To support remote teleoperation, an in-vehicle computing device 102 in the vehicle 112 (e.g., an autonomous driving system, a telematics unit, a control system of the vehicle 112, etc.) may establish one or more different delivery communication paths 106, 107, and/or 108 through a delivery cloud between the in-vehicle computing device 102 and the remote teleoperator computing device 104. The different delivery communication paths 106, 107, 108 may be delivery paths established via distinct LTE connections established by different LTE modems, delivery paths established via distinct V2X connections established by different modems, etc. The different delivery communication paths 106, 107, and/or 108 may all be the same type and/or frequency band paths or may be an assortment of different types and/or frequency band paths. In some embodiments, the in-vehicle computing device 102 may be part of the autonomous driving system, telematics unit, control system, etc. of the vehicle 112. In some embodiments, the in-vehicle computing device 102 may be a separate computing device, such as a system-on-chip computing device, in communication with the autonomous driving system, telematics unit, control system, etc. of the vehicle 112.

Sensors, cameras, and other systems of the vehicle 112 may provide inputs to the in-vehicle computing device 102. As examples, LIDARs, RADARs, accelerometers, tachometers, forward cameras, rear-view cameras, side cameras, etc., may provide inputs to the in-vehicle computing device 102. The inputs may be received from direct connections to the sensors, cameras, and other systems, and/or may be received via connections to other communication networks, such as the controller area network (CAN) bus, etc. of the vehicle 112, or other devices such as an Ethernet connection to another on-vehicle 112 device. The inputs may have different time sensitivities. For example, some data may update rapidly and be time sensitive, such as video data, LIDAR data, audio data, etc. As an alternative example, some data may update relatively slowly, such as data received from the vehicle's CAN bus, such as temperature sensor data, odometer data, etc.

Via the one or more different delivery paths 106, 107, and/or 108 the in-vehicle computing device 102 may send the inputs from the sensors, cameras, and other systems of the vehicle 112 to the remote teleoperator computing device 104. The remote teleoperator 110 may use the inputs from the sensors, cameras, and other systems of the vehicle 112 to manually operate or otherwise guide the vehicle 112. Such manual operation of guidance to the vehicle may be accomplished by controlling a remote teleoperator computing device 104 to transmit one or more commands to the in-vehicle computing device 102 via the one or more different delivery paths 106, 107, and/or 108.

In the example of the operation of the network 100 illustrated in FIG. 1A, an autonomous vehicle 112 approaches an unmetered intersection in which a police officer 115 is directing traffic, such as a truck 114, to merge into the lane of the vehicle 112. Based on inputs from the vehicle's 112 sensors, cameras, and other systems, the in-vehicle computing device 102 (or other computing device of the vehicle) may determine that the current operating conditions exceeds the safe operating capabilities of the vehicle's autonomous driving system, and thus requires remote teleoperation of the vehicle 112. For example, the high variability and potential randomness in the operations of the police officer 115 and the truck 114 in the merging scenario may be such that the autonomous control algorithms may not be capable of ensuring safe control the vehicle 112 in the scenario. In response to determining that a scenario for remote teleoperation is occurring, the in-vehicle computing device 102 may establish one or more different delivery paths 106, 107, and/or 108 through the delivery cloud to enable remote teleoperation of the vehicle 112 by the remote teleoperator 110 via his or her remote teleoperator computing device 104. The vehicle 112 may then be navigated through the merging situation via remote teleoperation or remote guidance. Upon successful navigation through the situation, remote teleoperation of the vehicle 112 may end and control may be passed back to the vehicle's autonomous driving system.

Additionally, the vehicle 112 may establish data connections with other devices, such as other vehicles (e.g., truck 114) to send and/or receive data from those other vehicles. The computing device 102 in the vehicle 112 may establish one or more different delivery paths 151, 152, and/or 153 directly between the in-vehicle computing device 102 and the in-truck computing device 154. The delivery paths may be established via distinct LTE connections established by different LTE modems, delivery paths established via distinct Wi-Fi connections established by different Wi-Fi modems, delivery paths established via distinct V2X connections established by different V2X modems, delivery paths established via distinct WiGig connections established by different WiGig modems, delivery paths established via distinct ANT connections established by different ANT modems, delivery paths establish via a combination of LTE, Wi-Fi, WiGig, ANT, and/or V2X modems, etc. The delivery paths 151, 152, and/or 153 may all be the same type and/or frequency band paths, or may be an assortment of different type and/or frequency band paths. In some embodiments, the in-truck computing device 154 may be part of the autonomous driving system, telematics unit, control system, etc. of the truck 114. In some embodiments, the in-truck computing device 154 may be a separate computing device, such as a system-on-chip computing device, in communication with the autonomous driving system, telematics unit, control system, etc. of the truck 114. Sensors, cameras, and other systems of the truck 114 may provide inputs to the in-truck computing device 154. As examples, LIDARs, RADARs, accelerometers, tachometers, forward cameras, rear-view cameras, side cameras, etc., may provide inputs to the in-truck computing device 154. The inputs may be received from direct connections to the sensors, cameras, and other systems, and/or may be received via connections to other communication networks, such as the truck's CAN bus, etc., or other devices, e.g., an Ethernet connection to another on truck 114 device. Via the one or more different delivery paths 151, 152, and/or 153 the in-vehicle computing device 102 and the in-truck computing device 154 may exchange their respective inputs from the sensors, cameras, and other systems. As an example of the transport of data exchanged between the truck 114 and the vehicle 112 via the one or more different delivery paths 151, 152, and/or 153, the vehicle 112 and truck 114 may exchange map data in a car-to-car mapping process. As another example, the vehicle 112 may send the truck 114 camera data of the police officer 115 to enable the truck 114 to better maneuver through the traffic scenario based on the camera data from the vehicle 112.

Figure 1B:
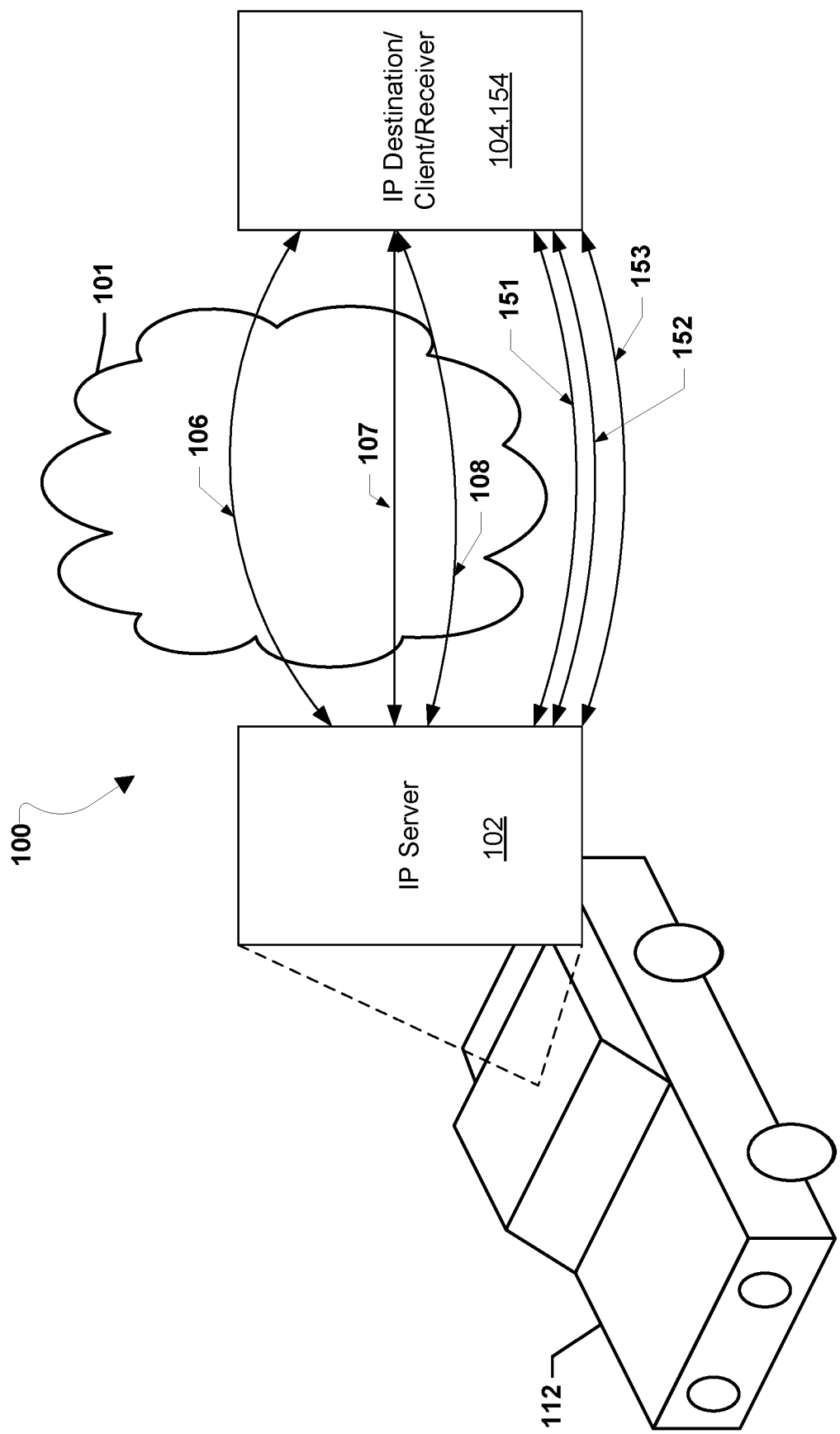
FIG. 1B is a communication system block diagram of a network suitable for use with various embodiments.

FIG. 1B illustrates further aspects of the network 100 suitable for use with various embodiments. As described with reference to FIG. 1A, the network 100 may include two computing devices 102, 104/154 configured to communicate with one another via IP transport sessions. At a given time in any IP transport session, one computing device (e.g., 102) may be the computing device sending IP subflows to the other computing device (e.g., remote teleoperator computing device 104, in-truck computing device 154, etc.) which may receive one or more of the IP subflows via different delivery paths 106, 107, and/or 108 established via a delivery cloud 101 (e.g., the Internet, LTE networks, V2X networks, etc.) and/or different delivery paths 151, 152, and/or 153 established directly, between the two computing devices 102, 104/154. The computing device (e.g., 102) sending the IP subflows may be referred to as the source computing device or server. The computing device (e.g., 104/154) receiving the IP subflows may be referred to as the destination computing device, client, or receiver. The different delivery paths 106, 107, and/or 108 may each be separate delivery paths through the delivery cloud 101 (e.g., delivery paths established via distinct LTE connections established by different LTE modems, delivery paths established via distinct V2X connections established by different V2X modems, etc.) and/or different delivery paths 151, 152, and/or 153 established directly and the different delivery paths may be routed from distinct Internet Protocol (IP) addresses of the computing device sending the IP subflows, such as in-vehicle computing device 102, to one or more IP addresses of the computing device receiving the IP subflows, such as remote teleoperator computing device 104, in-truck computing device 154, etc.

In various embodiments, each IP stream sent over the different delivery paths 106, 107, 108, 151, 152, and/or 153 may be the same. As such, should any one delivery path experience a failure, another delivery path may still provide the same IP stream, thereby providing redundancy and improved quality of service. For example, each IP stream may be the same IP stream sent over the different delivery paths 106, 107, 108, 151, 152, and/or 153. In various embodiments, the IP streams may enable a receiver to recover the original IP stream. In various embodiments, delivery paths 106, 107, 108, 151, 152, and/or 153 may be assigned different priorities, such as one delivery path (e.g., 106, 107, 108, 151, 152, or 153) may be prioritized over the other delivery paths (e.g., 106, 107, 108, 151, 152, or 153). Delivery paths 106, 107, 108, 151, 152, and/or 153 may be prioritized relative to one another based on one or more path attributes associated with the delivery paths 106, 107, 108, 151, 152, and/or 153, such as cost, bandwidth, quality-of-service (QoS), transmission delay, transmission queue size, transmission rate, indications from an end point (e.g., remote teleoperator computing device 104 or in-truck computing device 154 indicating a preferred path), etc.

Figure 2:
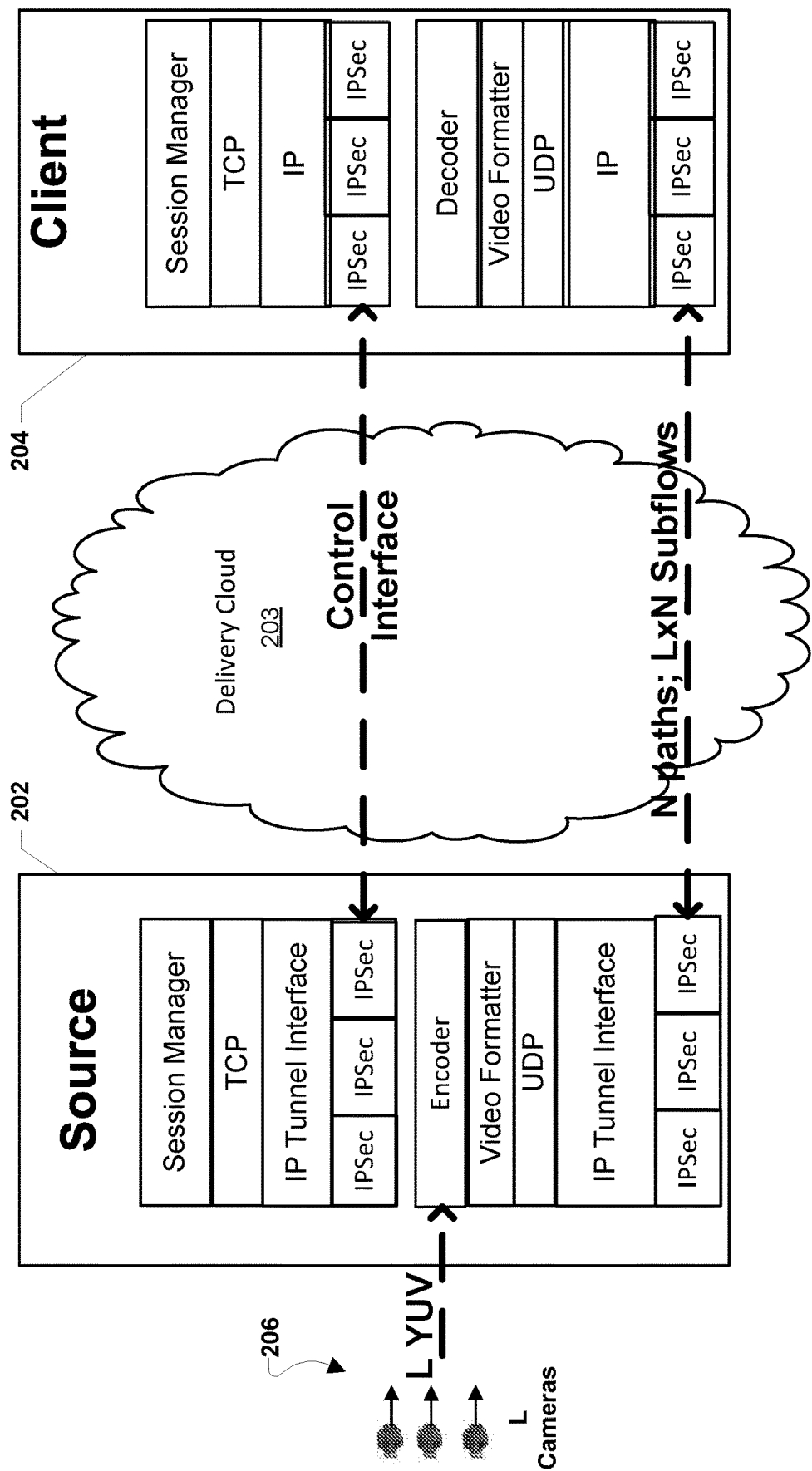
FIG. 2 is a system block diagram illustrating relationships between network elements and the computing device layers (or stacks) in a network according to various embodiments.

FIG. 2 illustrates relationships between a source 202 and a client 204 in a network according to various embodiments. The source 202 may receive inputs from "L" number of sensors, such as cameras 206, such as three cameras, at an encoder. The encoder may output a stream of IP packets, such as media packets (e.g., video packets, etc.) including the inputs from each camera 206 (or sensors (e.g., LIDAR, RADAR, accelerometers, tachometers, etc.), other systems, etc.), such as for transmission to the client 204. The encoder may output the IP stream to a video formatter stack (or layer), a UDP stack (or layer), an IP tunnel interface, and IP security layers. The stream of IP packets may be spread over "N" number of streams (e.g., three streams as illustrated), such that each stream may include inputs from the "L" sensors (e.g., cameras 206 (or sensors, other systems, etc.)) in separate subflows. The "N" streams may be sent via respective Virtual Private Network (VPN) tunnels established via the respective modems for transmission via respective IP addresses to the IP address of the client 204 over the delivery cloud 203 (e.g., the Internet, LTE networks, V2X networks, etc.) Each stream may be sent over its own delivery path, such that "N" different delivery paths may each provide "L" subflows to the IP address of each client 204 in the delivery session.

In various embodiments, security may be applied to the IP streams on a per stream basis by IP security layers at the modems, such that each VPN is established using separate IP security. Each VPN established by the modems may have its own assigned IP address, and each VPN's IP address may be part of the same subnet.

The delivery session between the source 202 and the client 204 may be managed by a session manager on the source 202. The session manager may operate as an IP level scheduler for controlling the assignment of IP packets to the modems of the source 202. Session control information may be exchanged between the source 202 and the client 204 via any pathway, such as a dedicated control channel between one or more IP addresses of the source 202 and an IP address of the client 204, one of the "N" different delivery paths used for the transport of the streams, or any other delivery mechanism. The session control information may indicate various information including the number of video streams, a media description including video encoder configuration and IP packet information, bandwidth, IP address and port information to receive video streams and their corresponding control packets, etc. The session control information may indicate IP security contexts for the IP transport session, such as encryption and authentication keys, for the IP subflows.

The client 204 may receive the IP subflows sent via the "N" different delivery paths. In the opposite manner of the IP source 202, the client 204 may pass the received IP packets of the streams via an IP stack (or layer), UDP stack (or layer), and video formatter, to a decoder (or sensor signal processing device, other system processor, etc.). The decoder may decode the packets to produce the original "L" camera (or sensor, other system, etc.) inputs for further use by the client 204. For example, the client 204 may be a backend server that may store the original "L" camera inputs for use by a remote teleoperator. As another example, the client 204 may be the remote teleoperator computing device 104 and the remote teleoperator computing device 104 may output the original "L" camera (or sensor, other system, etc.) inputs to the remote teleoperator 110 to enable the remote teleoperator 110 to control the vehicle 112.

Figure 3:
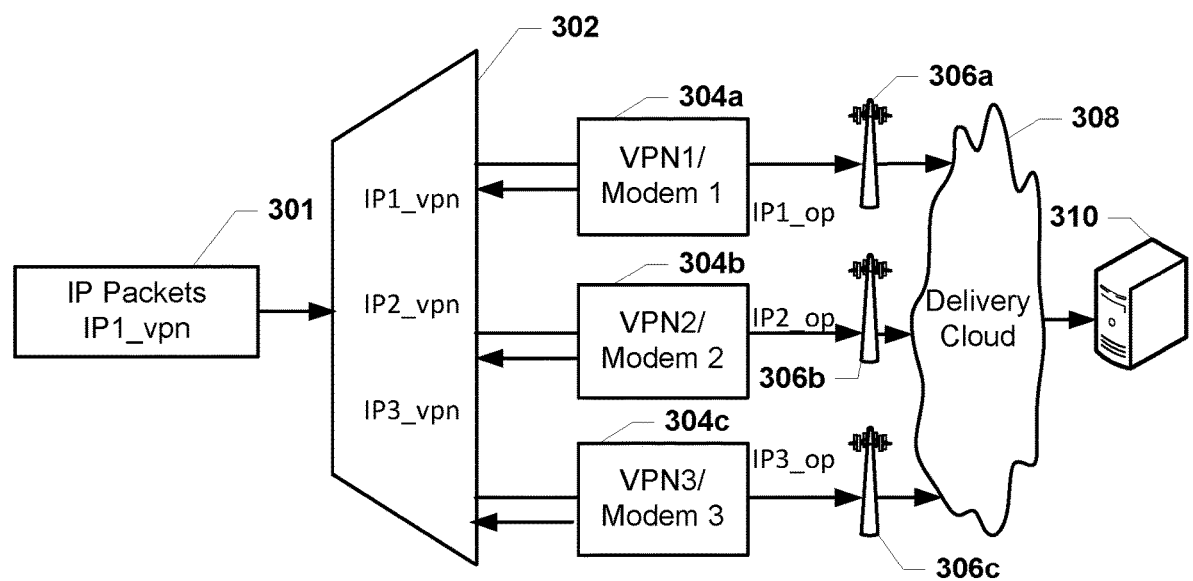
FIG. 3 is a system block diagram of an IP level scheduler of media streams within a source computing device according to various embodiments.

FIG. 3 illustrates an IP level scheduler 302 of media streams within a source computing device. Each modem 304a, 304b, 304c may periodically provide to the scheduler 302 the observed bit rate and the queue size on its modem control (MC) interface. In various embodiments, feedback from sender and/or receiver reports included in tracking information added to IP packets may provide overall end-to-end statistics. Feedback provided by the appended tracking information in the IP packets may provide per path end-to-end statistics. Based on the received statistics, the scheduler 302 may distribute IP packets onto subflows on the available interfaces.

As illustrated in FIG. 3, IP packets 301 received at the scheduler 302 may be sent on to the modems 304a, 304b, 304c. The IP level scheduler 302 may receive IP packets at a single IP address, such as an IP address denoted by "IP1_vpn." Each modem 304a, 304b, 304c may have its own respective IP address assigned, such as the IP address denoted by "IP1_vpn", "IP2_vpn", and "IP3_vpn." The single IP address of the IP level scheduler 102 may be the same as an IP address of one of the modems, or may be a different IP address. The single IP address of the IP level scheduler 102 and the IP addresses of each of the modems 304a, 304b, 304c may all be of the same subnet. Each modem 304a, 304b, 304c may communicate with a different operator network 306a, 306b, 306c, such as eNode Bs of different service provider run LTE networks. The different operator networks 306a, 306b, 306c may be the same type and frequency band networks, or may be an assortment of different type frequency band networks. The operator networks 306a, 306b, 306c may form pathways through the delivery cloud 308 to provide the IP streams (e.g., IP1_op, IP2_op, IP3_op) to the IP destination device 310, such as a server. The pathways may be separate VPNs. The IP streams may arrive at a resequencing buffer of the IP destination device 310 and be output for playback at the IP destination device.

Figure 4:
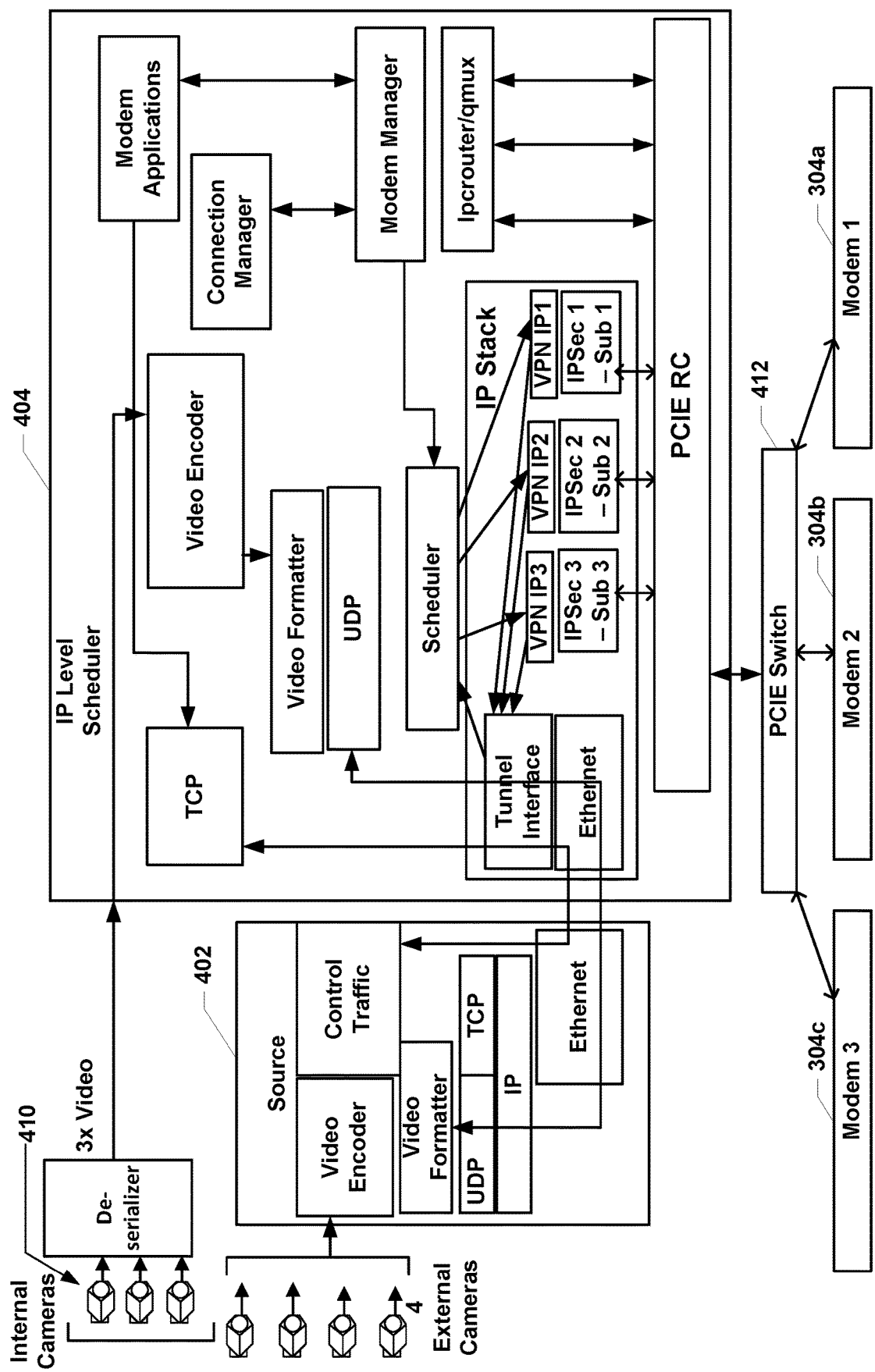
FIG. 4 is a system block diagram illustrating relationships between network elements and the computing device layers (or stacks) in a network according to various embodiments.

FIG. 4 illustrates example relationships between a source computing device 402 and an IP level scheduler 404 in a network according to various embodiments. The IP level scheduler 404 may be similar to the IP level scheduler 302 described above with reference to FIG. 3. The internal cameras 410 may provide outputs to the video encoder of the IP level scheduler 404, which may output the IP streams for the internal cameras (or other sensors) to the IP stack (or layer). In various embodiments the IP level scheduler 404 and source device 402 may be components of the same device and/or system.

The source computing device 402 may connect to the IP level scheduler 404 using a local Ethernet connection. The Ethernet connection may handle session control signaling between the source computing device 402 and the IP level scheduler 404. The Ethernet connection may also provide the outputs of the four external cameras as IP streams to the IP stack (or layer) of the IP level scheduler 404. In various embodiments, an application on the source computing device 402 may establish and maintain a control connection to the IP level scheduler 404.

The IP level scheduler 404 may connect to 3 modems 304a, 304b, 304c via a Peripheral Component Interconnect Express (PCIE) switch 412. In some embodiments, some or all of the modems 304a, 304b, 304c could be with the same carrier. In some embodiments, each modem 304a, 304b, 304c may have its own subscription with a different service provider. For example, each modem 304a, 304b, 304c may be a different LTE modem establishing a different connection with a different carrier network. As another example, each modem 304a, 304b, 304c may be a different V2X modem. Costs, bandwidths, and QoS for each service provider and/or carrier network may be the same or different. Additionally, the capabilities of each modem 304a, 304b, 304c may be the same or different. The modems 304a, 304b, 304c may be the same type of modem operating in the same frequency bands or may be an assortment of different types of modems operating in different frequency bands. The modem manager may support multiple modems, and the connection manager may provide basic control to modem applications for accessing and managing the modems 304a, 304b, 304c. The modem manager interface may provide further functionality for accessing modem controls and information. For example, the uplink reporting of the available delivery rates on the modems (e.g., a MC (or MN) interface) may be available on the modem manager interface. A scheduler of the IP level scheduler 404 may schedule IP packets for the streams to the modems 304a, 304b, 304c. In various embodiments, the scheduler may be part of the IP stack of the IP level scheduler 404. In various embodiments, the scheduler may be a standalone application interfacing with other stacks (or layers) of the IP level scheduler 404, such as the IP stack (or layer), TCP stack (or layer), modem manager, and/or modem applications, etc.

IPSec tunnels, IPSec1, IPSec2 and IPSec3 may be established to the backend IP client (e.g., a backend server). In this manner, multiple virtual interfaces, each using its own VPN IP address VPN IP1, VPN IP2, and VPN IP3, may be established. IPSec header and trailer overhead may be taken into account when establishing the interfaces. The IP level scheduler 404 may establish and maintain a control connection to the backend IP client (e.g., a backend server).

The IP level scheduler 404 may deliver the streams (e.g., video streams, sensor streams, etc.) to the IP client (e.g., a backend server). The streams (e.g., video streams, sensor streams, etc.) may be delivered using one or more of the three paths established by the modems 304a, 304b, 304c. The IP level scheduler 404 may prefer one path over other paths due to possibly favorable terms from the corresponding operator. In some embodiments, the IP level scheduler 404 may establish all single-path communications over the interface associated with the preferred operator. Any artificial favoring of one interface may increase the delay in the system. However, the packet scheduling algorithms of the various embodiments may route the traffic to the queues that hold less data. In this manner, competing TCP traffic may be given a chance to get through because the scheduler will divert IP traffic to queues with less occupancy and delay.

Thus, the queue serving TCP may be avoided by the IP scheduler due to the additional queue size caused by TCP. In various embodiments, the IP stack (or layer) may provide rate control feedback. For example, the IP stack (or layer) may compare an aggregate available rate to aggregate source rates. The IP stack (or layer) may provide a suggested transmit rate per source whenever needed.

Figure 5:
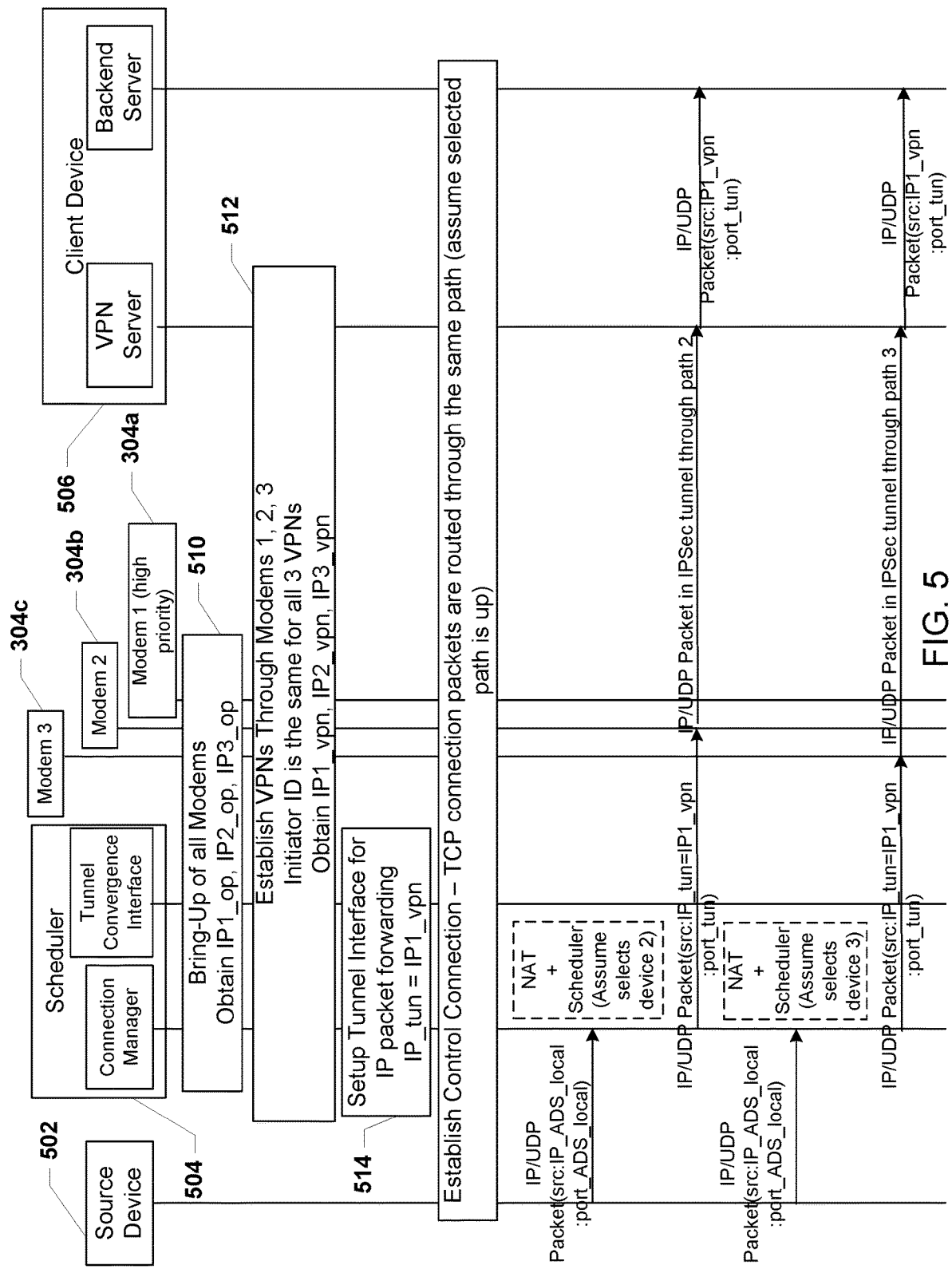
FIG. 5 is a call flow diagram illustrating interactions between an IP level scheduler and client computing device to establish an IP transport session according to an embodiment.

FIG. 5 is a call flow diagram illustrating interactions between an IP level scheduler 504 and destination (or client) computing device 506 to establish an IP transport session according to an embodiment. In various embodiments the IP level scheduler 504 may be similar to schedulers 302 and 404 described above and the client device 506 may be similar to client devices 104 and 204 described above. For example, the interactions illustrated in FIG. 5 may be used to establish a session for an internal camera stream (or other sensor, etc.) and/or an external camera stream (or other sensor, etc.).

Initially the scheduler 504 may bring up all modems and obtain IP addresses for the modems in block 510. In block 512, the scheduler 504 may establish VPNs through the modems 304a, 304b, 304c to a VPN server of the client device 506. The initiator ID may be the same for all VPNs and the scheduler 504 may obtain the IP addresses of the three VPNs.

In block 514, the scheduler 504 may set up a tunnel interface for IP packet forwarding. The tunnel interface may be a single IP address at the scheduler 504 to which all IP packets for transport to the client device 506 (e.g., media packets from cameras) may be sent. The single IP address and the VPN addresses may be in the same subnet. For example, the single IP address may be the same IP address as the IP address of one of the VPNs. IP packets for transport to the client device 506, such as IP packets from the source device 502 or other cameras, may arrive at the single IP address of the scheduler and be assigned to VPN paths of the modems 304a, 304b, 304c for transport by the selected path to the VPN server of the client device 506. The IP packets may then be passed from the VPN server to the backend server of the client device 506 for consumption at the client device 506.

Figure 6:
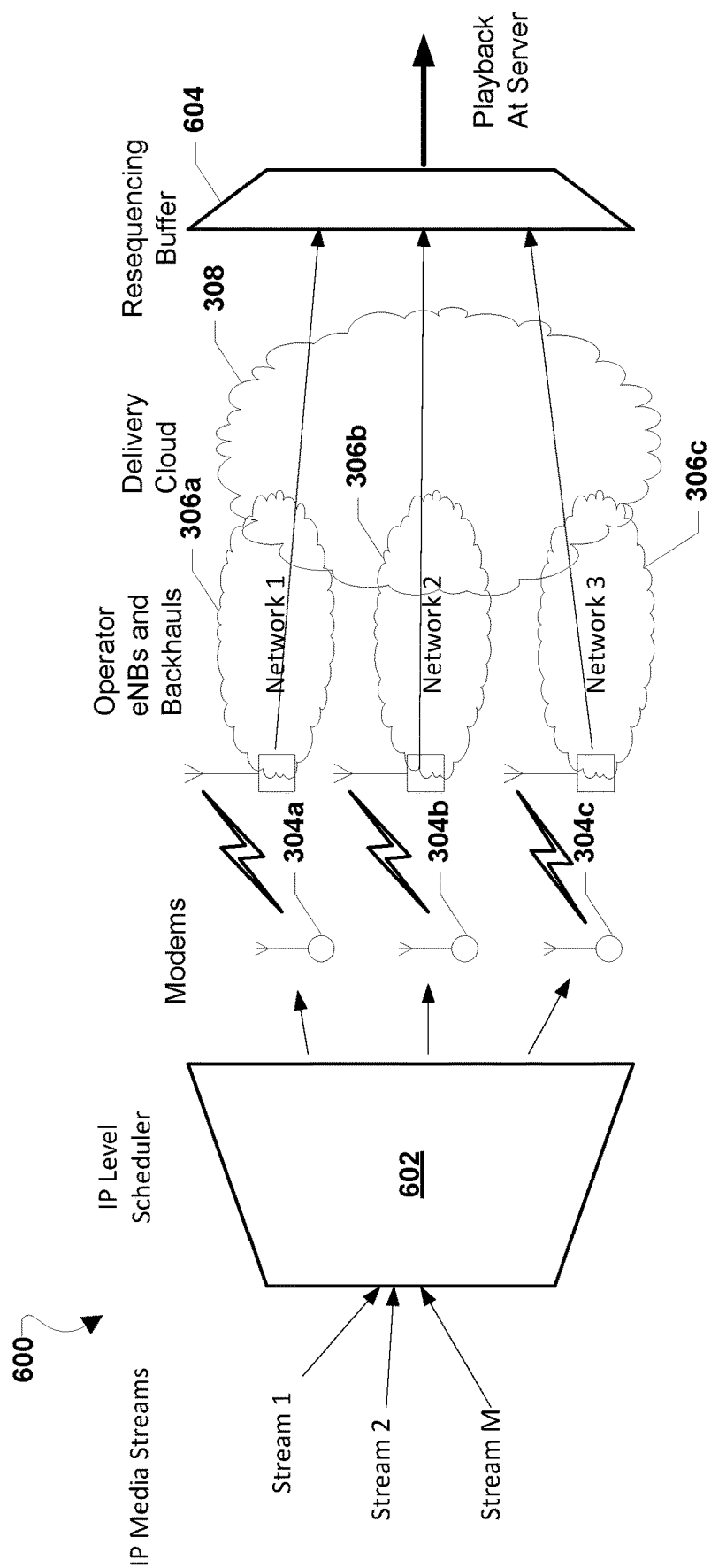
FIG. 6 illustrates a delivery chain of media streams within an IP level scheduler according to various embodiments.

FIG. 6 illustrates a delivery chain 600 of media streams (e.g., video streams, sensor streams, etc.) within an IP level scheduler 602, such as IP level schedulers 302, 404, and 504 described above. The IP level scheduler 602 may be configured to add tracker information to IP packets received as the IP streams. The tracker information may include sequence numbers for the IP packets to be transported via the modems 304a, 304b, 304c on an overall and/or per-path basis. Tracker information may also include other information, such as sender reports, versioning information, length indications, etc. Additionally, IP packets received by the modems from the client device receiving the IP packet streams may include tracker information, such as ping responses, ping reports, receiver reports, sender reports, etc. Tracker information may be added by the scheduler 602 and/or client devices as headers, trailers, or other types of information insertions into the IP packets. In various embodiments, the scheduler 602 and/or client devices may modify the IP packet header checksums to account for the addition of the tracker information. In various embodiments, a new header may be added including the tracker information and the IP packets of the IP stream may be encapsulated in new IP/UDP packets and/or new Generic Routing Encapsulation (GRE) packets. For example, the new header may be added within an IP/UDP packet such that the IP/UDP packet encapsulates both the new header and the originally received IP packet. As another example, the new header may be added as part of an extended GRE header within an encapsulating IP packet such that the encapsulating IP packet encapsulates both the extended GRE header and the originally received IP packet. In a similar manner, the same encapsulation mechanism used for the originally received IP packet (e.g., GRE, IP/UDP, etc.) may be used to encapsulate control packets. Each modem 304a, 304b, 304c may periodically provide the observed bit rate and the queue size on its modem control (MC) interface to the IP level scheduler 602.

The tracker information added to the IP packets may provide overall end-to-end statistics. Feedback from the client devices, such as receiver reports included in tracker information, may provide per path end-to-end statistics. Based on the received statistics, the IP level scheduler 602 may distribute IP packets onto subflows on the available interfaces. As illustrated in FIG. 6, IP media streams 1 through M may be sent to the scheduler 602 and on to the modems 304a, 304b, 304c. Each modem 304a, 304b, 304c may communicate with a different operator network 306a, 306b, 306c, such as eNode B's of different service provider run LTE networks, different V2X devices, etc. The operator networks 306a, 306b, 306c may form pathways, such as VPNs, through the delivery cloud to provide the IP streams to the destination device, such as a server. The IP streams may arrive at a resequencing buffer 604 of the destination device and be output for playback at the destination device.

Figure 7:
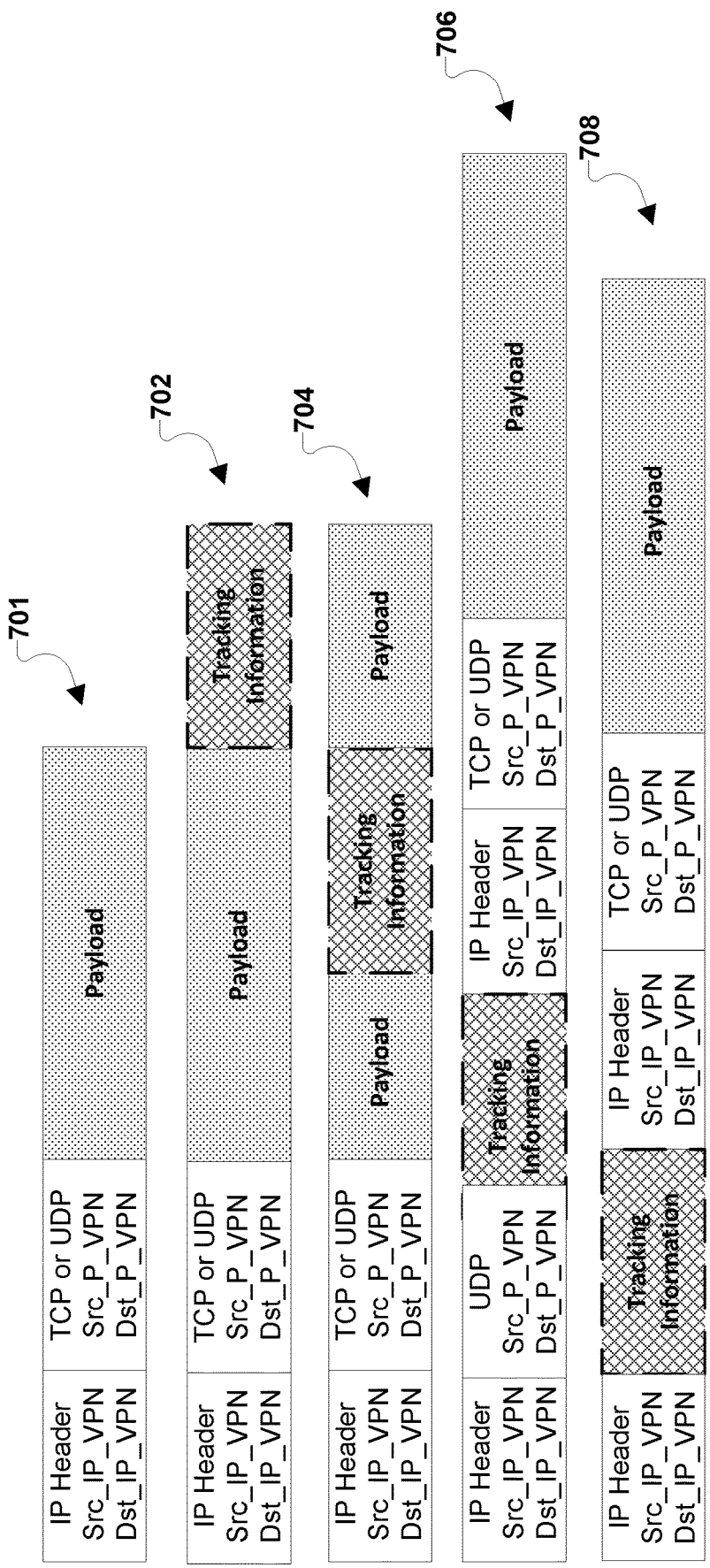
FIG. 7 illustrates block diagrams of IP packets including tracking information according to various embodiments.

FIG. 7 illustrates a received IP packet 701 and IP packets 702, 704, 706, and 708 including tracking information according to various embodiments. The IP packet 701 represents a standard IP packet as received by an IP level scheduler, such as IP level schedulers 302, 404, and 504 described above, from various devices such as internal or external cameras. The IP packet 701 may include an IP header and TCP/UDP header and payload. The IP header may include a checksum for validating the packet.

The IP packet 702 includes tracking information added to the packet according to an embodiment. In this embodiment, tacking information may be added to the IP packet 701, such as by an IP level scheduler or destination computing device, as a trailer to generate IP packet 702. The trailer of tracking information may be added by an append operation. In such embodiments, the checksum of the IP packet 702 may be recalculated and modified to account for the additional length of the tracking information added to the packet.

The IP packet 704 includes tracking information added to the packet according to an embodiment. In this embodiment, tacking information may be added to the IP packet 701, such as by an IP level scheduler or destination computing device, as an insertion into the body of the packet to generate IP packet 704. In this manner, the insertion of the tracking information may be at a point other than the header position or trailer position. In various embodiments, the checksum of the IP packet 704 may be recalculated and modified to account for the additional length the tracking information may add to the packet.

The IP packet 706 includes tracking information added to the packet as part of an encapsulating IP/UDP packet according to an embodiment. In this embodiment, the IP packet 701 may be encapsulated as a new IP/UDP packet and tracking information may be added in the header of the new IP/UDP packet, such as by an IP level scheduler or destination computing device, to generate the IP packet 706. In this manner a header may be added within the new IP/UDP packet such that the new IP/UDP packet encapsulates both the header including the tracking information and the IP packet 701.

The IP packet 708 includes tracking information added to the packet as part of an encapsulating IP packet according to an embodiment. In this embodiment, the IP packet 701 may be encapsulated as IP packet and tracking information that may be added in the GRE header of the new IP packet, such as by an IP level scheduler or destination computing device, to generate the IP packet 708. In this manner, the tracking information may be added as part of the GRE header within an encapsulating IP packet such that the resulting new encapsulating IP packet encapsulates both the GRE header and the original IP packet 701.

FIGS. 8A and 8B illustrate example schemas for appended tracking information according to various embodiments. FIG. 8A illustrates an example header 802 format according to an embodiment. FIG. 8B illustrates an example trailer 804 format according to an embodiment.

As illustrated in FIGS. 8A and 8B, tracking information may include a version field (e.g., V=0). Tracking information may include an indication that the tracking information includes an overall sequence number (e.g., O). An overall sequence number may be the sequence number of that IP packet in the overall flow of all IP packets. Tracking information may include an indication that the tracking information includes a path sequence number (e.g., P). A path sequence number may be the sequence number of that IP packet in the set of IP packets sent along the same pathway. Tracking information may include a class indicator. Class indicators may identify the type of information in the packet, such as UDP, TCP, etc., and may enable different quality of service (QOS) levels and different resequencing buffers to be applied on a per-class basis. Tracking information may include the length of the tracking information added to the packet. The length may be a 4-bit length position. Tracking information may include a header and payload type indication. A header and payload type indication (HPT) may be a 3-bit position indicating whether the payload is a regular payload with an s sequence number, a sender report, or a receiver report. For example, the value 0 may indicate a regulate payload, the value 1 may indicate a sender report, and the value 2 may indicate a receiver report. Tracking information may include a path identifier (e.g., PathID). The PathID may be a 4-bit value indicating the path assigned to the packet. Tracking information may include the overall sequence number. For example, the overall sequence number may be 16 bits. Tracking information may include a path sequence number. For example, the path sequence number may be 16 bits.

Figure 9A:
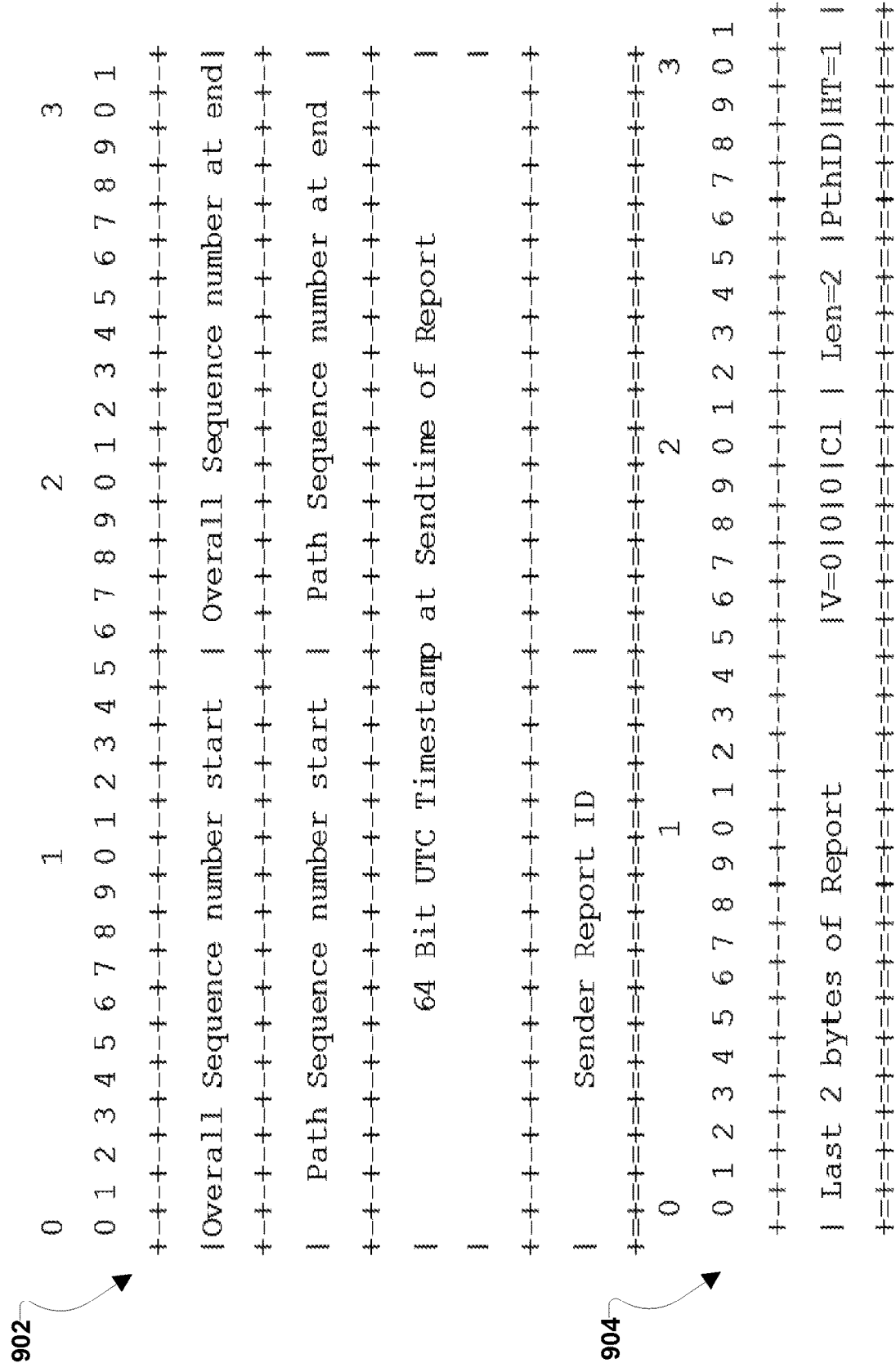
FIG. 9A illustrates example sender report tracking information according to various embodiments.

FIG. 9A illustrates example sender report tracking information according to various embodiments. The sender report tracking information may include a sender report 902. In the example illustrated in FIG. 9A, the tracking information is formatted as a trailer and includes a trailer portion 904 at the end of the report 902. However, the tracking information may alternatively be formatted as a header or insertion into another portion of an IP packet in which case the trailer portion 904 may not be necessary or may be reformatted as a header or other type portion. The sender report 902 may include the overall sequence number starting and ending sequence numbers, the path sequence number starting and ending numbers, and the Coordinated Universal Time (UTC) timestamp of the sending time of the sender report 902.

FIG. 9B illustrates example receiver report tracking information according to various embodiments. The receiver report tracking information may include a receiver report 906. In the example illustrated in FIG. 9B, the tracking information is formatted as a trailer and includes a trailer portion 908 at the end of the report 906. However, the tracking information may alternatively be formatted as a header or insertion into another portion of an IP packet in which case the trailer portion 908 may be not necessary or may be reformatted as a header or other type portion. The receiver report 906 may include the overall sequence number starting and ending sequence numbers, the path sequence number starting and ending numbers, the number of lost packets, the number of out of order packets, a number of sent packets on a path, sequence numbers sent on a path, the UTC timestamp of the receiving time of the last received sender report, and/or a delay from reception of the last received sender report to generation of a current sender report at a device generating the current sender report.

Figure 10A:
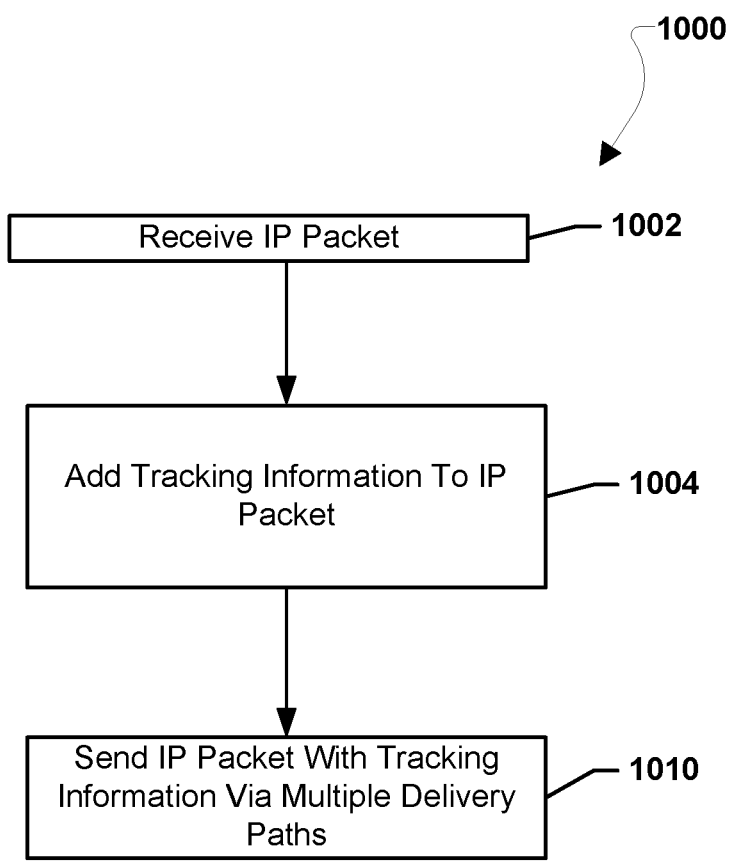
FIG. 10A is a process flow diagram illustrating an embodiment method for adding tracking information in IP flows.

FIG. 10A illustrates an embodiment method 1000 for adding tracking information to IP subflows. In various embodiments, the operations of the method 1000 may be performed by an IP level scheduler running on a processor of a computing device, such as IP level schedulers 302, 404, 504, and 602 described above. In various embodiments, the operations of the method 1000 may be performed by a processor of a client device, such as client devices 104, 204, and 506 described above.

In block 1002 the IP level scheduler or client device may receive an IP packet. For example, the IP packet may be received from a camera or other device in communication with the IP level scheduler or client device.

In block 1004 the IP level scheduler or client device may add tracking information to the IP packet. As examples, tracking information may be added as a trailer, a header of an encapsulating packet (e.g., an IP/UDP packet, GRE IP packet, etc.), or inserted at a point other than the start or finish of the IP packet. In various embodiments, tracking information may include version information, indications that the tracking information includes an overall sequence number, an indication that the tracking information includes a path sequence number, a class indicator, the length of the tracking information added to the packet, a header and payload type indication, a path identifier, an overall sequence number, a path sequence number, a sender report, and/or a receiver report. Thus, the received IP packet may be extended to include tracking information.

In block 1010, the IP level scheduler or client device may send the IP packet including the tracking information via multiple delivery paths, such as one or more of various VPNs established via different modems, such as modems 1, 2 3 discussed above. The delivery paths may be the same type operating in the same frequency bands or may be an assortment of different types operating in different frequency bands.

Figure 10B:
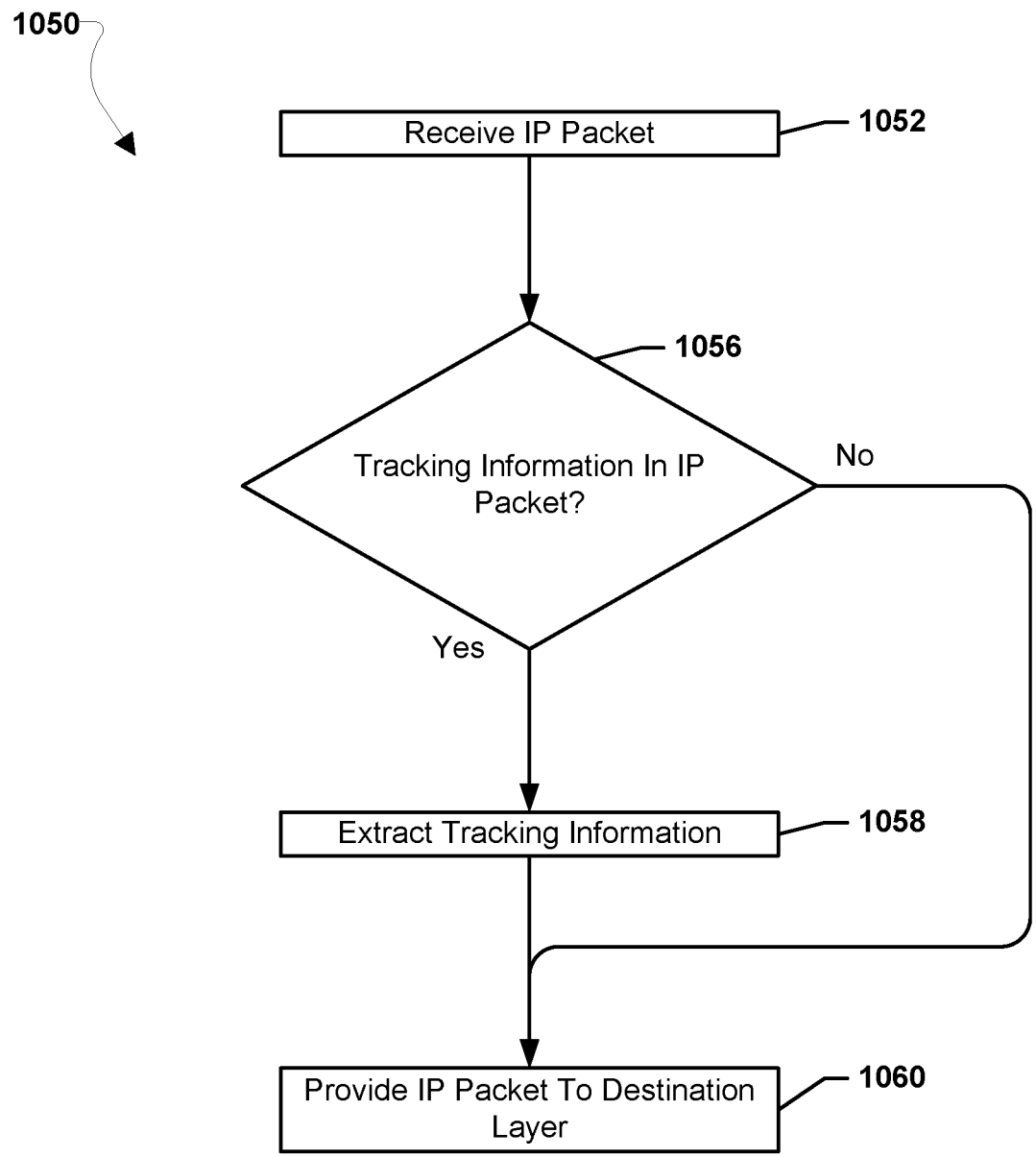
FIG. 10B is a process flow diagram illustrating an embodiment method for handling IP packets with tracking information from an IP stream.

FIG. 10B illustrates an embodiment method 1050 for handling IP packets with tracking information from an IP stream. In various embodiments, the operations of method 1050 may be performed by an IP level scheduler running on a processor of a computing device, such as IP level schedulers 302, 404, 504, and 602 described above. In various embodiments, the operations of the method 1050 may be performed by a processor of a client device, such as client devices 104, 204, and 506 described above. In various embodiments, the operations of the method 1050 may be performed in conjunction with the operations of the method 1000 described with reference to FIG. 10A.

In block 1052, the IP level scheduler or client device may receive an IP packet. The IP packet may be received via one or more delivery paths, such as one or more of various VPNs established via different modems, such as modems 304a, 304b, 304c discussed above.

In determination block 1056, the IP level scheduler or client device may determine whether the IP packet includes tracking information. For example, the IP level scheduler or client device may determine whether a header, trailer, or other type field within the IP packet indicates that the IP packet includes tracking information.

In response to determining that the IP packet includes tracking information (i.e., determination block 1056="Yes"), the IP level scheduler or the client device may extract the tracking information in block 1058. For example, the IP level scheduler or client device may remove the tracking information header, trailer, or other type field, thereby reconstituting the original IP packet before tracking information was added. The tracking information may be used by the IP level scheduler or client device for various purposes, including error detection and correction, resequencing, delay adjustments, etc. For example, when the tracking information includes sender and receiver reports, the delivery rate estimates for one or more modems may be adjusted based on an end-to-end detection mechanism using a sender report and a receiver report.

In response to extracting the tracking information in block 1058 or in response to determining that tracking information is not included in the IP packet (i.e., determination block 1056="No"), the IP level scheduler or client device may provide the IP packet to its destination layer (or stack) in block 1060. As examples, the IP packet may be provided to a video formatter, decoder/encoder, scheduler module, session manager, etc.

Figure 10C:
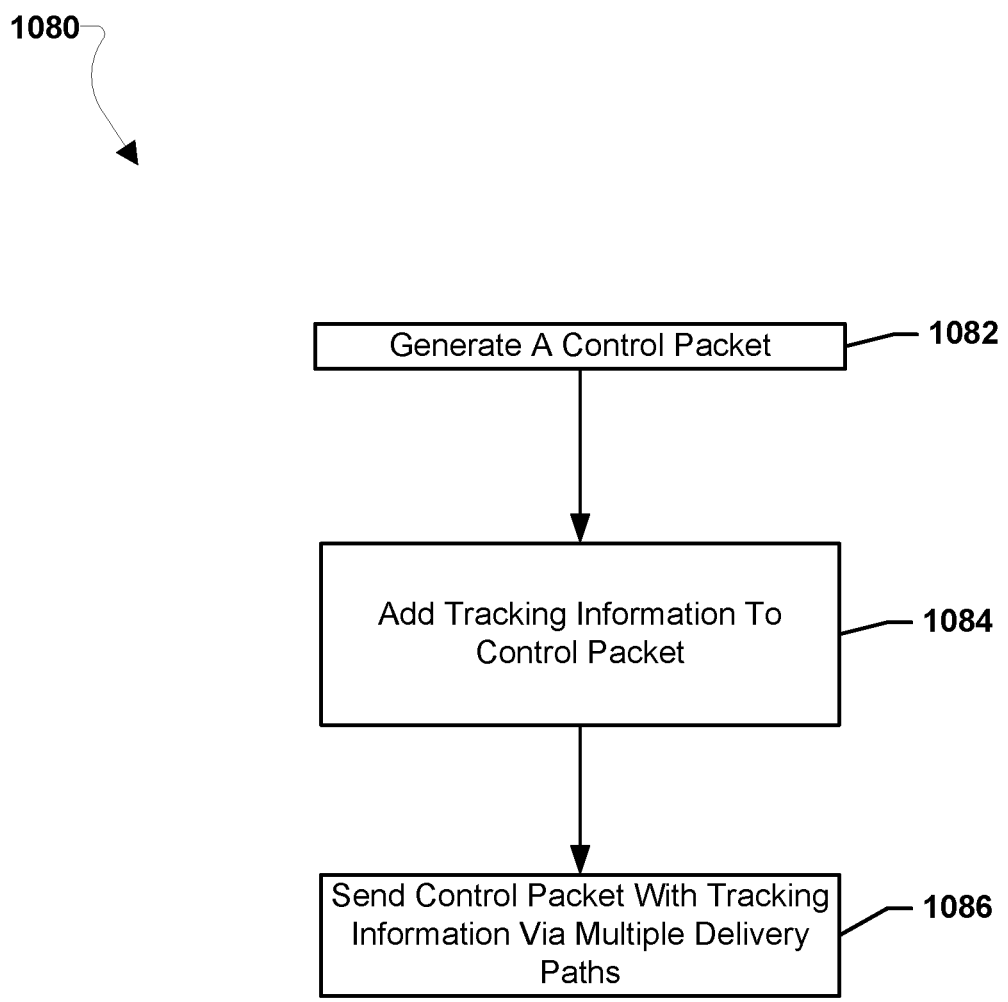
FIG. 10C is a process flow diagram illustrating an embodiment method for sending control packets in IP flows.

FIG. 10C illustrates an embodiment method 1080 for sending control packets in IP subflows. In various embodiments, the operations of the method 1080 may be performed by an IP level scheduler running on a processor of a computing device, such as IP level schedulers 302, 404, 504, and 602 described above. In various embodiments, the operations of the method 1000 may be performed by a processor of a client device, such as client devices 104, 204, and 506 described above. In various embodiments, the operations of the method 1080 may be performed in conjunction with the operations of methods 1000 (FIG. 10A) and/or 1050 (FIG. 10B).

In block 1082, the IP level scheduler or client device may generate a control packet. In various embodiments, the control packet may include control information, such as a ping report, a sender report, and/or a receiver report. The control information may be control information for one or more paths.

In block 1084, the IP level scheduler or client device may add tracking information to the control packet. As examples, tracking information may be added as a trailer, a header of an encapsulating packet (e.g., an IP/UDP packet, GRE IP packet, etc.), or inserted at a point other than the start or finish of the control packet. In various embodiments, tracking information may include version information, indications that the tracking information includes an overall sequence number, an indication that the tracking information includes a path sequence number, a class indicator, the length of the tracking information added to the packet, a header and payload type indication, a path identifier, an overall sequence number, a path sequence number, a sender report, and/or a receiver report. Thus, the generated control packet may be extended to include tracking information. In various embodiments, the control packet may be encapsulated (e.g., in an IP/UDP packet, GRE IP packet, etc.) using the same encapsulation mechanism as applied to IP packets by the IP level schedule or client device in performing the operations of block 1004 of the method 1000 described with reference to FIG. 10A.

In block 1086, the IP level scheduler or client device may send the control packet including the tracking information via multiple delivery paths, such as one or more of various VPNs established via different modems, such as modems 304a, 304b, 304c discussed above. The delivery paths may be the same type operating in the same frequency bands or may be an assortment of different types operating in different frequency bands.

Figure 11:
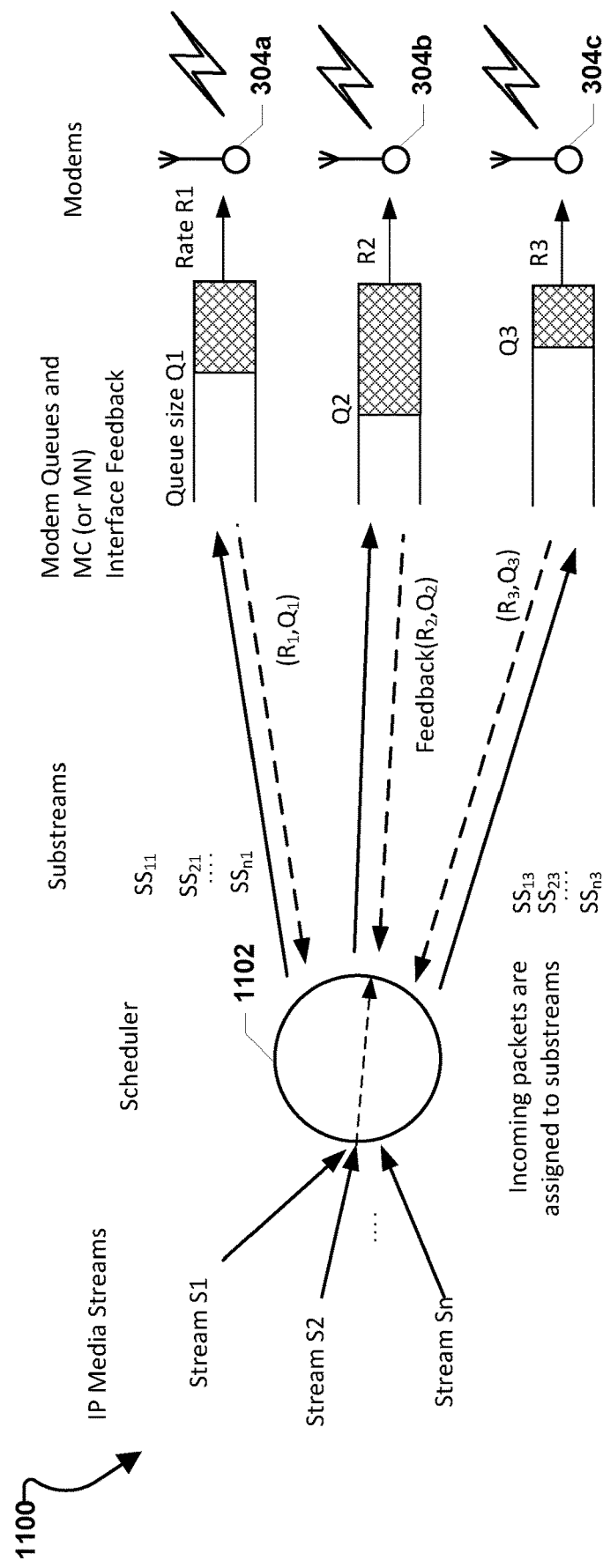
FIG. 11 illustrates packet level interactions between a scheduler and modems according to various embodiments.

FIG. 11 illustrates packet level interactions 1100 between a scheduler 1102, such as IP level schedulers 302, 404, 504, 602 described above, and modems 304a, 304b, 304c according to various embodiments. Incoming packets may be distributed to the modems for delivery. Each stream $S_i$ may be split into steams $S_{i1}, S_{i2}, \ldots, S_{in}$, where n is the number of modems available to the scheduler 1102, such as 3 modems 304a, 304b, 304c. The scheduler 1102 may take into account all available information and various levels of information sharing may occur between the IP layers (or stacks), the scheduler 1102, the modems 304a, 304b, 304c, and the destination device. In various embodiments, the scheduler 1102 may be centralized and operate on all streams simultaneously. In various embodiments, the modems 304a, 304b, 304c may report their respective modem queue levels to the packet schedule via MC (or MN) interface feedback. For example, the modems 304a, 304b, 304c may report their queue size (Qn) and transmission rate (Rn) as feedback on the MC (or MN) interface. The scheduler 1102 may assign incoming packets to the modems 304a, 304b, 304c based at least in part on the queue size and transmission rates for the modems 304a, 304b, 304c. In various embodiments, a scheduler 1102 may rely on rate and queue level feedback from the modems. In various embodiments, the scheduler 1102 may monitor end-to-end congestion beyond the air interface. The rates per interface may be reduced to accommodate network congestion.

In various embodiments, a scheduler 1102 may receive per path statistics through the MC (or MN). In various embodiments, modems may provide their available rates and queue sizes through the MC (or MN) interface. In various embodiments, the scheduler 1102 may determine an estimate of the round-trip delay based on the exchange of sender and receiver reports via tracking information added to IP packet exchanged with the destination device.

A subflow receiver report (SRR) may be sent from the destination device in tracking information added to an IP packet. The subflow receiver report (SRR) may include a reference to the last subflow sender report (SSR) received by the destination device in tracking information added to IP packets sent by the scheduler 1102, and an indication of the delay between the reception of said subflow sender report (SSR) and the generation of the subflow receiver report (SRR) at the destination device (i.e., SRR generation delay). The scheduler 1102 may keep track of the generation time of the subflow sender report (SSR) (i.e., the SSR Tx time) and the receipt time of the subflow receiver report (SRR) (i.e., the SRR Rx time).

Once the subflow receiver report (SRR) is received at the scheduler 1102, the scheduler 1102 may determine a round trip time (RTT) estimate on the path on which the subflow sender report (SSR) and subflow receiver report (SRR) were exchanged according to the equation RTT=(SRR Rx time)−(SRR generation delay)−(SSR Tx time). RTT estimates may also be referred to as end-to-end delay (EED) estimates. In various embodiments, the scheduler 1102 may use knowledge of the path rate (Ri) and current queue length (Qi) to enhance the estimate according to the equation RTT=((SRR Rx time)−(Qi/Ri at SRR generation)−(SRR generation delay)−(SSR Tx time)), where the SRR generation time may be determined by subtracting the SSR generation delay from a SRR Tx time. To get the best estimate of queue length (Qi), SRR may be on path i after receiving a MC (or MN) report for that path.

Figure 12:
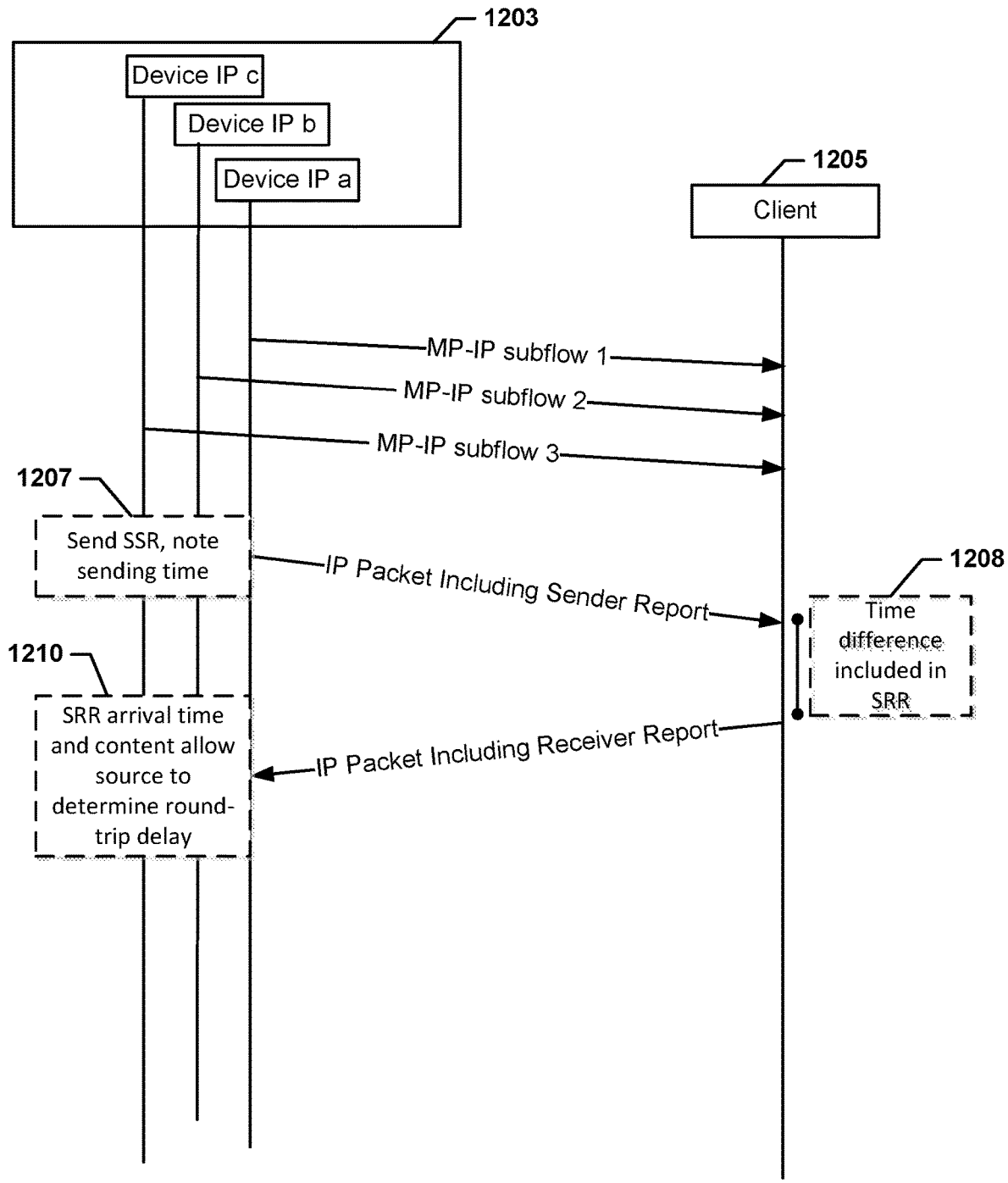
FIG. 12 is a call flow diagram illustrating a sender and receiver exchange between an IP level scheduler and destination computing device.

FIG. 12 is a call flow diagram illustrating a sender and receiver exchange of a subflow sender report (SSR) and subflow receiver report (SRR) between an IP level scheduler 1203, such as IP level schedulers 302, 404, 504, 602 described above, and a destination (or client) computing device 1205, such as client devices 104, 204, 506 described above. At some point after the IP subflows are established, an SSR may be sent in operation 1207 as an IP packet including tracking information that includes the sender report and the sending time recorded by the IP level scheduler 1203. In operation 1208, the destination (or client) computing device 1205 may determine the time difference between receiving the SSR and sending the SRR and include that time difference in the SRR. The SRR may be sent as tracking information included in an IP packet. The IP level scheduler 1203 may receive the SRR and, based on the SRR receipt time and the time different between receiving the SSR and sending the SRR in the SRR, determine the round-trip delay (or end-to-end delay) in operation 1210.

Figure 13A:
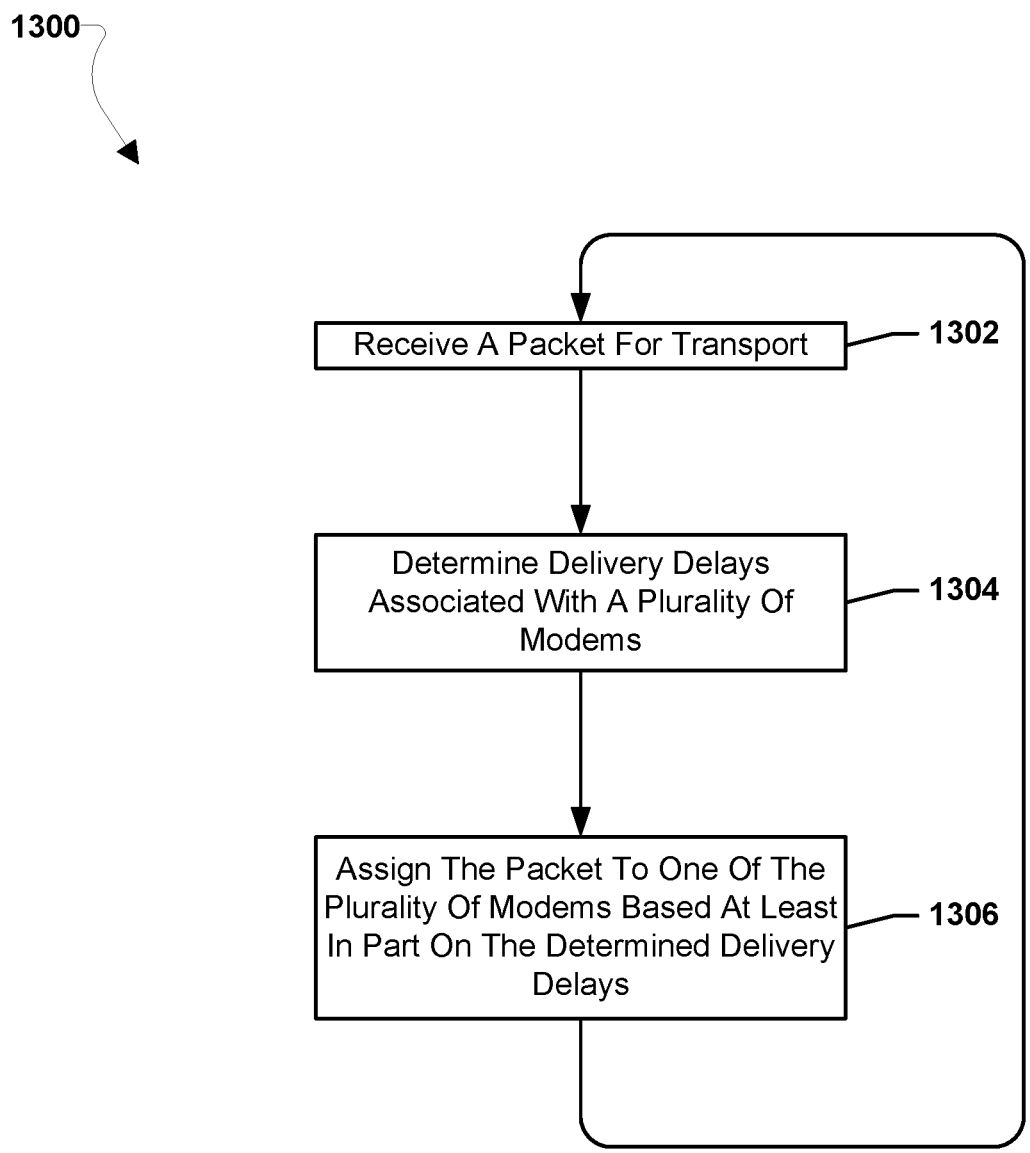
FIG. 13A is a process flow diagram illustrating an embodiment method for scheduling IP transmissions.

FIG. 13A illustrates an embodiment method 1300 for scheduling IP transmissions. In various embodiments, the operations of method 1300 may be performed by a scheduler running on a processor of a computing device, such as IP level schedulers 302, 404, 504, 602, and 1203 described above. In various embodiments, the operations of method 1300 may be performed in conjunction with the operations of any of method 1000 described with reference to FIG. 10A, method 1050 described with reference to FIG. 10B, and/or method 1080 described with reference to FIG. 10C.

In block 1302, the scheduler may receive a packet for transport. For example, the packet may be a packet of various IP streams for transport, such as media streams received from encoders for transport to a backend server via various VPNs.

In block 1304, the scheduler may determine delivery delays associated with a plurality of modems. As discussed above, in various embodiments, the scheduler may receive indications of per path statistics for delivery paths associated with each available modem, such as 2, 3, 4, or more modems available for transport. In various embodiments, a scheduler may receive per path statistics through the MC (or MN) interface and/or via traffic information received in IP packets. In various embodiments, modems may provide their available delivery rates and queue sizes through the MC (or MN) interface. In various embodiments, delivery delays may be determined based on one or more of queue sizes of the plurality of modems, delivery rate estimates of the plurality of modems, and end-to-end delay estimates.

In various embodiments, the scheduler may determine a delivery delay associated with one of a plurality of modems (i) based at least in part on the delivery rate estimate for the modem (Ri) and the queue size of the modem (Qi). For example, the scheduler may determine the delivery delay as the packet size (PS) of the packet plus the queue size of the modem (Qi) divided by the delivery rate estimate for the modem (Ri) plus the end-to-end delay (EDD) estimate for the delivery path associated with the modem (i.e., delivery delay=((PS+Qi)/Ri)+EDD). A packet size (PS) may be determined from header information of the packet. A delivery rate estimate for the modem (Ri) and the queue size of the modem (Qi) may be determined from reports received via the MC (or MN) interface and/or through traffic information received in IP packets. An end-to-end delay (EDD) estimate may be determined according to the operations discussed above with reference to FIGS. 11 and 12. In various embodiments, queue size of the modem (Qi) may be updated when the packet is received by subtracting the elapsed time since the last queue size report was received (ElapsedTime) multiplied by the delivery rate estimate for the modem (Ri) from the last reported queue size (Qi) (i.e., Qi=Qi−(ElapsedTime∗Ri)).

In block 1306, the scheduler may assign the packet to the one of the plurality of modems based at least in part on the determined delivery delays. In various embodiments, the scheduler may assign the packet to the one of the plurality of modems based at least in part on the determined delivery delays by assigning the packet to the modem with the lowest delivery day among the plurality of delivery delays. In this manner, by comparing the delivery delays determined for each of a plurality of modems, such as 2, 3, 4, or more modems, the scheduler may minimize the delay expected to be experienced in sending the packet at the time the packet is scheduled. In various embodiments, the queue size of the modem (Qi) may be updated between queue reports by adding the packet size (PS) of a packet assigned to the modem to the last determined queue size (i.e., Qi=Qi+PS).

In various embodiments, the scheduler may further assign packets for transport based on delivery delays and path priorities associated with the plurality of modems. For example, as discussed above, delivery paths for the available modems, such as modems 304a, 304b, 304c, may be associated with different priorities based on one or more path attributes such as cost of using delivery paths, bandwidth of delivery paths, QoS of delivery paths, end point indications of a preferred path, etc. The scheduler may account for those relative priorities when assigning packets for transport. For example, one delivery path may be the highest priority path (e.g., due to lowest cost), and the scheduler may determine whether the delivery delay of the modem of that path is above a delay threshold (e.g., 0.2 seconds). In response to determining the delivery delay is below the delay threshold, the scheduler may assign the packet to that modem. In response to determining the delivery delay is at or above the delay threshold, the scheduler may assign the packet to the modem with the lowest delivery delay. In this manner, as long as delivery delay for the highest priority path is below the delay threshold, packets may be biased to the modem of the highest priority path.

In response to assigning the packet to a modem, the scheduler may return to block 1302 to await the next packet for scheduling.

In various embodiments, the scheduler may be configured to reduce the delivery rate estimate or bandwidth reported (such as on the MC (or MN) interface) by a percentage to ensure that bandwidth is available on a modem for use in transporting other traffic. Such a bandwidth backoff may be applied to all available modems or to a subset of available modems, such as just a preferred modem. In various embodiments, the percentage reduction may be adjusted depending on the confidence in the delivery rate estimate or bandwidth reported (such as the delivery rate estimate or bandwidth reported on the MC (or MN) interface).

Figure 13B:
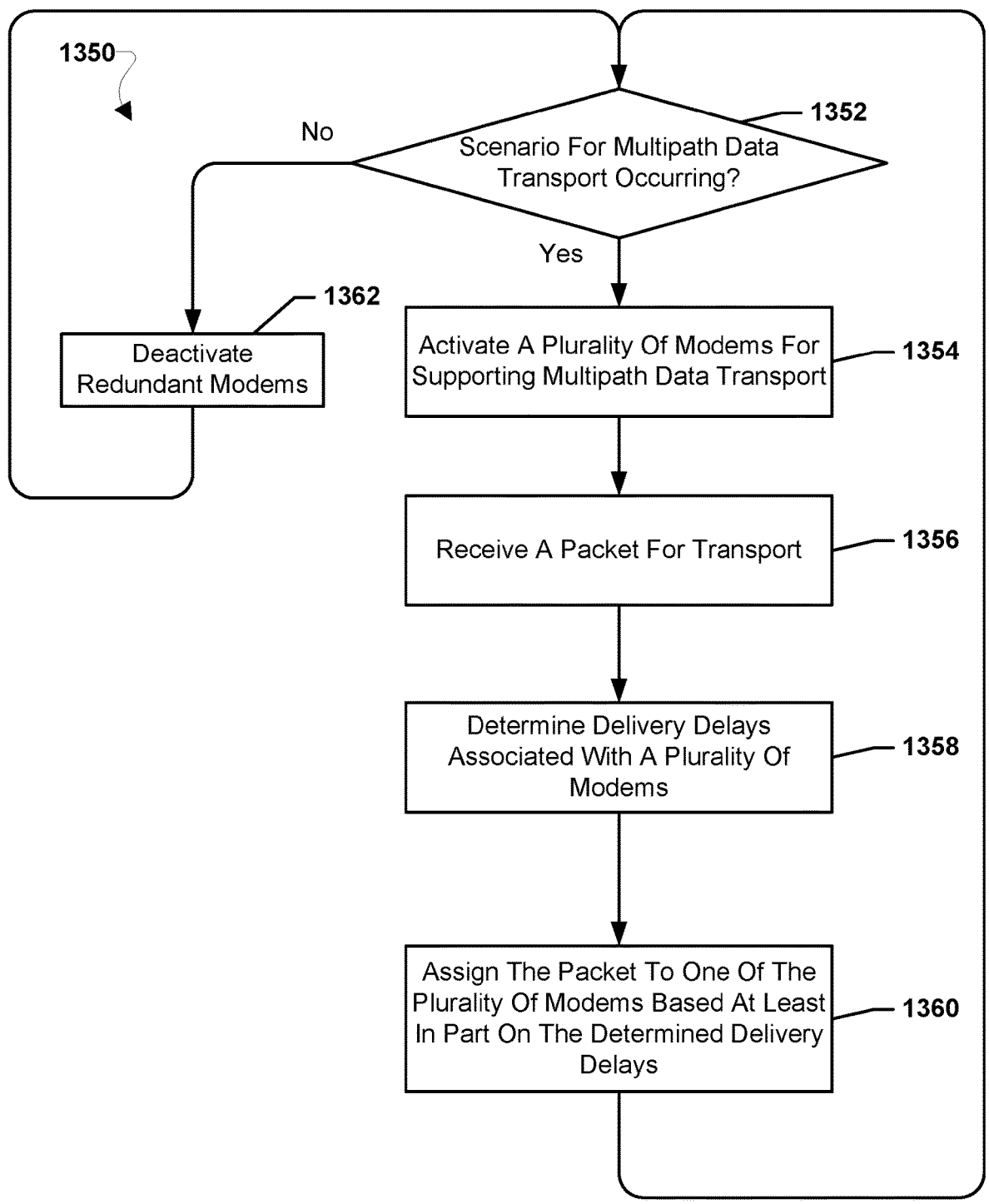
FIG. 13B is a process flow diagram illustrating an embodiment method for scheduling IP transmissions.

FIG. 13B illustrates an embodiment method 1350 for scheduling IP transmissions. In various embodiments, the operations of method 1350 may be performed by a scheduler running on a processor of a computing device, such as IP level schedulers 302, 404, 504, 602, and 1203 described above. In various embodiments, the operations of method 1350 may be performed in conjunction with the operations of any of method 1000 described with reference to FIG. 10A), method 1050 described with reference to FIG. 10B), and/or method 1080 described with reference to FIG. 10C.

In determination block 1352, the scheduler of the in-vehicle computing device may determine whether a scenario for multipath data transport is occurring. For example, the scheduler of the in-vehicle computing device may determine whether a scenario for remote teleoperation is occurring which may be a scenario for multipath data transmission. A scenario for remote teleoperation may be a situation involving variable and/or random characteristics that the vehicle computing device or another computing device within the vehicle recognizes as potentially benefiting from remote teleoperation by a remote teleoperator. For example, the high variability and potential randomness in the operations of the police officer 115 and the truck 114 in the merging scenario described with reference to FIG. 1A may be such that the autonomous control algorithms may not be capable of ensuring safe control the vehicle 112 in the scenario. The vehicle computing device or another computing device within the vehicle may recognize the scenario, for example by image detection recognizing the presence of the police officer 115, and the detection of the police officer 115 may be a trigger indicating a scenario for remote teleoperation is occurring. As another example, the scheduler of the in-vehicle computing device may determine whether a scenario for car-to-car mapping is occurring appropriate for multipath data transmission. Car-to-car mapping may benefit from the transmission of data from the vehicle, such as vehicle 112, to another vehicle, such as truck 114, to enable the two vehicles to benefit from all or a portion of the same sensor data map, e.g., a LIDAR image of the vehicle vicinity. Further examples of scenarios for multipath data transmission that the scheduler of the in-vehicle computing device may recognize include: a scenario in which the transport of on vehicle sensor data (e.g., tachometers, accelerometers, etc.) may be required to remote vehicle diagnostic services; a scenario in which the transport of vehicle camera images to other vehicles may be needed to alert those other vehicles of traffic patterns; and a scenario in which the transport of sensor data or camera images to other vehicles or traffic monitoring services to report the status of traffic control equipment may be needed (e.g., whether a traffic light is green or red, whether a traffic light is working or disabled, the posted speed limit for a road as indicated by a highway sign, etc.).

In response to determining that a scenario for multipath data transport is occurring (i.e., determination block 1352="Yes"), the scheduler of the in-vehicle computing device may activate a plurality of modems for supporting multipath data transport in block 1354. The plurality of modems may include two, three, four, or more modems. The plurality of modems may be different modems, such as different LTE modems, different V2X modems, an assortment of different type modems, etc. Each of the plurality of modems may be configured to establish connections via different service providers. Upon activation, each of the plurality of modems may establish its own respective different delivery path through the delivery cloud to a remote teleoperator computing device, such as computing device 104 (FIGS. 1A and 1B). The different delivery paths may each be separate delivery paths through the delivery cloud routed from distinct IP addresses of the in-vehicle computing device to one or more IP addresses of the remote teleoperator computing device. For example, each of the activated plurality of modems may have its own delivery path with a unique IP address for the in-vehicle computing device side while all delivery paths may have the same IP address for the remote teleoperator computing device side. As another example, in remote scenarios, the remote teleoperator computing device side may have multiple IP addresses, each valid on a different delivery network. In various embodiments, each of the plurality of modems and their respective delivery paths may be assigned different priorities, such as one delivery path being prioritized over the other delivery paths. Delivery paths may be prioritized relative to one another based on one or more path attributes associated with the delivery paths, such as cost, bandwidth, quality-of-service (QoS), etc.

In block 1356, the scheduler of the in-vehicle computing device may receive a packet for transport, such as a packet carrying data supporting remote teleoperation. Data supporting remote teleoperation may include data generated by cameras, sensors, or other systems of a vehicle to be used by a remote teleoperator to control the vehicle. The data may be packetized and received from encoders or other signal processing devices for transport to remote teleoperator computing device. For example, the packet may be a packet of various IP streams for transport, such as media streams received from encoders, for transport to a backend server or other remote teleoperator computing device via various VPNs.

In block 1358, the scheduler of the in-vehicle computing device may determine delivery delays associated with a plurality of modems. As discussed above, in various embodiments, the scheduler of the in-vehicle computing device may receive indications of per path statistics for delivery paths associated with each available modem, such as 2, 3, 4, or more modems available for transport. In various embodiments, a scheduler of the in-vehicle computing device may receive per path statistics through the MC (or MN) interface and/or via traffic information received in IP packets. In various embodiments, modems may provide their available delivery rates and queue sizes through the MC (or MN) interface. In various embodiments, delivery delays may be determined based on one or more of queue sizes of the plurality of modems, delivery rate estimates of the plurality of modems, and end to end delay estimates.

In various embodiments, the scheduler of the in-vehicle computing device may determine a delivery delay associated with one of a plurality of modems (i) based at least in part on the delivery rate estimate for the modem ($R_i$) and the queue size of the modem ($Q_i$). For example, the scheduler of the in-vehicle computing device may determine the delivery delay as the packet size (PS) of the packet plus the queue size of the modem ($Q_i$) divided by the delivery rate estimate for the modem ($R_i$) plus the end to end delay (EDD) estimate for the delivery path associated with the modem (i.e., delivery delay=$((PS+Q_i)/R_i)+EDD$). A packet size (PS) may be determined from header information of the packet. A delivery rate estimate for the modem ($R_i$) and the queue size of the modem ($Q_i$) may be determined from reports received via the MC (or MN) interface and/or via traffic information received in IP packets. An end to end delay (EDD) estimate may be determined according to the operations discussed above with reference to FIGS. 11 and 12. In various embodiments, queue size of the modem ($Q_i$) may be updated when the packet is received by subtracting the elapsed time since the last queue size report was received (ElapsedTime) multiplied by the delivery rate estimate for the modem (Ri) from the last reported queue size (Qi) (i.e., Qi=Qi−(ElapsedTime·Ri)).

In block 1360, the scheduler of the in-vehicle computing device may assign the packet to the one of the plurality of modems based at least in part on the determined delivery delays. In various embodiments the scheduler of the in-vehicle computing device may assign the packet to the one of the plurality of modems based at least in part on the determined delivery delays by assigning the packet to the modem with the lowest delivery day among the plurality of delivery delays. In this manner, by comparing the delivery delays determined for each of a plurality of modems, such as 2, 3, 4, or more modems, the scheduler of the in-vehicle computing device may minimize the delay expected to be experienced in sending the packet at the time the packet is scheduled. In various embodiments, the queue size of the modem (Qi) may be updated between queue reports by adding the packet size (PS) of a packet assigned to the modem to the last determined queue size (i.e., Qi=Qi+PS).

In various embodiments, the scheduler of the in-vehicle computing device may further assign packets for transport based on delivery delays and path priorities associated with the plurality of modems. For example, as discussed above, delivery paths for the available modems, such as modems 1, 2, and 3, may be associated with different priorities based on one or more path attributes such as cost of using delivery paths, bandwidth of delivery paths, QoS of delivery paths, end point indications of a preferred path, etc. The scheduler of the in-vehicle computing device may account for those relative priorities when assigning packets for transport. For example, one delivery path may be the highest priority path (e.g., due to lowest cost), and the scheduler of the in-vehicle computing device may determine whether the delivery delay of the modem of that path is above a delay threshold (e.g., 0.2 seconds). In response to determining the delivery delay is below the delay threshold, the scheduler of the in-vehicle computing device may assign the packet to that modem. In response to determining the delivery delay is at or above the delay threshold, the scheduler of the in-vehicle computing device may assign the packet to the modem with the lowest delivery delay. In this manner, as long as delivery delay for the highest priority path is below the delay threshold, packets may be biased to the modem of the highest priority path. Additionally, the scheduler of the in-vehicle computing device may further assign packets for transport based on delivery delays, path priorities associated with the plurality of modems, and computing resource pool priorities. For example, the scheduler of the in-vehicle computing device may prioritize packets generated by certain computing resources over other computing resources and may account for those relative priorities when assigning packets for transport.

In response to assigning the packet to a modem, the scheduler of the in-vehicle computing device may return to block 1352 and determine again whether a scenario for multipath data transport is occurring. In response to determining that a scenario for multipath transport is not occurring (i.e., determination block 1352="No"), the scheduler of the in-vehicle computing device may deactivate redundant modems in block 1362. Deactivating redundant modems may include deactivating all or a portion of the modems. For example, all but the modem associated with a highest priority path may be deactivated. As another example, all the modems may be deactivated. By deactivating redundant modems, computing resources and/or power may be conserved and costs associated with maintaining unneeded delivery paths may be avoided.

In various embodiments, the scheduler of the in-vehicle computing device may be configured to reduce the delivery rate estimate or bandwidth reported (such as on the MC (or MN) interface) by a percentage to ensure that bandwidth is available on a modem for use in transporting other traffic. Such a bandwidth backoff may be applied to all available modems or to a subset of available modems, such as just a preferred modem. In various embodiments, the percentage reduction may be adjusted depending on the confidence in the delivery rate estimate or bandwidth reported (such as the delivery rate estimate or bandwidth reported on the MC (or MN) interface).

Figure 14:
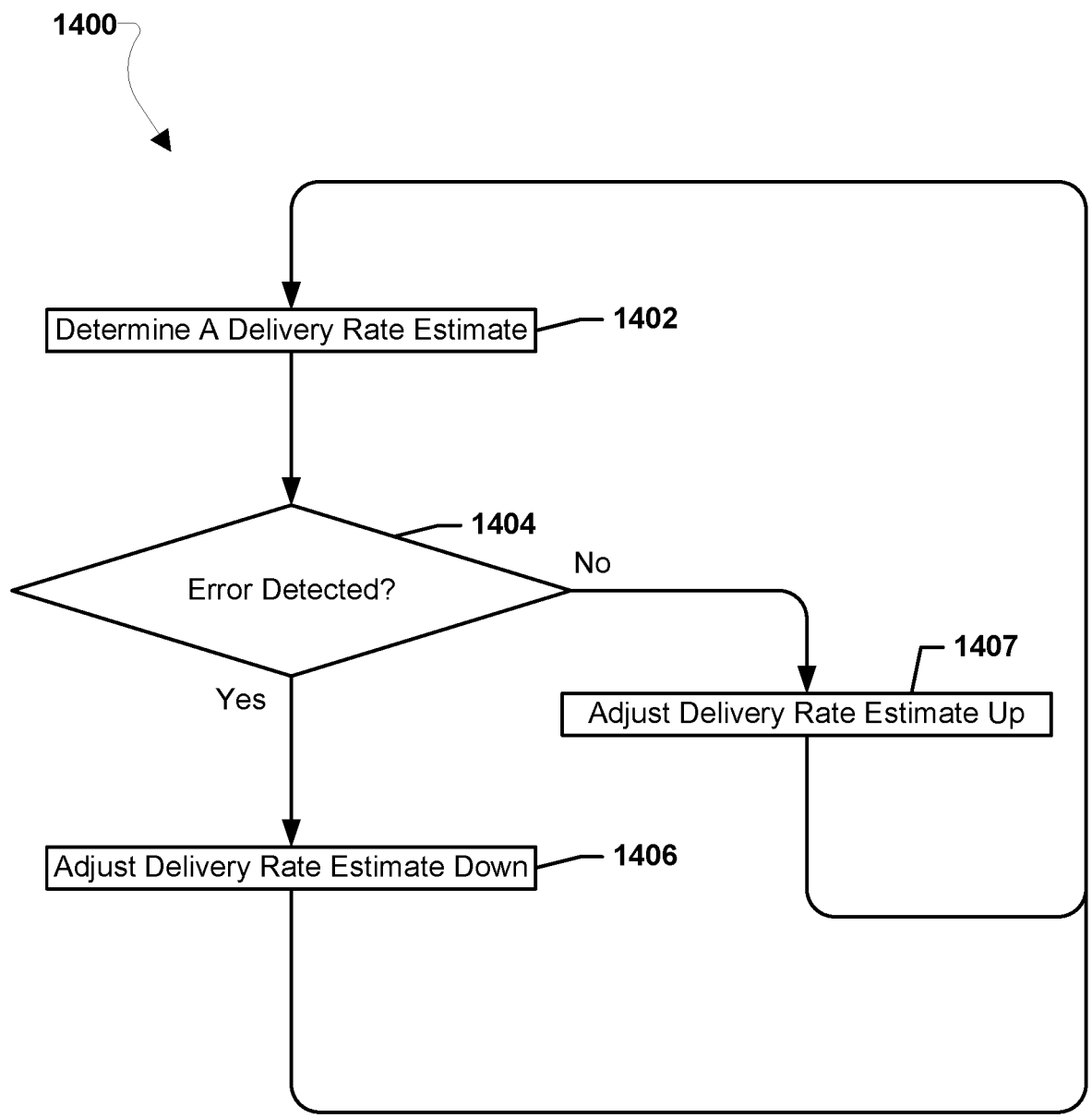
FIG. 14 is a process flow diagram illustrating an embodiment method for adjusting delivery rate estimates based on error detections.

FIG. 14 illustrates an embodiment method 1400 for adjusting delivery rate estimates based on error detections. In various embodiments, the operations of the method 1400 may be performed by a scheduler running on a processor of a computing device, such as IP level schedulers 302, 404, 504, 602, and 1203 described above. In various embodiments, the operations of the method 1400 may be performed in conjunction with the operations of any of method 1000 described with reference to FIG. 10A, method 1050 described with reference to FIG. 10B, method 1080 described with reference to FIG. 10C, method 1300 described with reference to FIG. 13A, and/or method 1350 described with reference to FIG. 13B.

In block 1402 the scheduler may determine a delivery rate estimate. In various embodiments, the scheduler may determine the delivery rate estimate based on path statistics delivered through the MC (or MN) interface and/or via traffic information received in IP packets. Path statistics may include a reported delivery rate estimate. In various embodiments, the delivery rate estimate may be a delivery rate estimate the scheduler adjusted by a percentage to ensure that bandwidth was available on a modem for use in transporting other traffic.

In determination block 1404, the scheduler may determine whether an error is detected associated with the path for the modem. In various embodiments, errors may be detected by the scheduler receiving an error report from the modem. In some embodiments, the error report may be generated based at least in part on an end-to-end error detection mechanism using sender reports and/or receiver reports to detect errors.

In response to determining no error is detected (i.e., determination block 1404="No"), the scheduler adjust the delivery rate estimate up in block 1407 and may return to block 1402 to determine a next delivery rate estimate. For example, when errors are not detected in a reporting period, the error factor may be increased by adding a percentage point to the error factor. In an embodiment, the scheduler may update the delivery rate estimate according to fixed equations. As another example, when no error is detected the rate may be increased by a fixed percentage. In various embodiments, when the rate is at 100%, no further adjustment may be performed. In various embodiments, delivery rate adjustments may be made every round trip time.

In response to determining an error is detected (i.e., determination block 1404="Yes"), the scheduler may adjust the delivery rate estimate in block 1406. Adjusting the delivery rate estimate may occur in an outer-loop processes that occurs in parallel to receiving and assigning packets by the scheduler. In an embodiment, the scheduler may update the delivery rate estimate based on an error factor. For example, the updated delivery rate estimate may be determined based on the current delivery rate estimate times the error factor. The error factor may start at 100%. When an error is detected, the error factor may be reduced by half. In an embodiment, the scheduler may update the delivery rate estimate according to fixed equations. For example, when an error is detected, the rate may be divided by half. In some embodiments, the scheduler may select between the reported delivery rate estimate from the modem and the adjusted delivery rate estimate when determining a delivery delay. For example, the scheduler may select the lower delivery rate estimate of the two when assigning packets.

Figure 15:
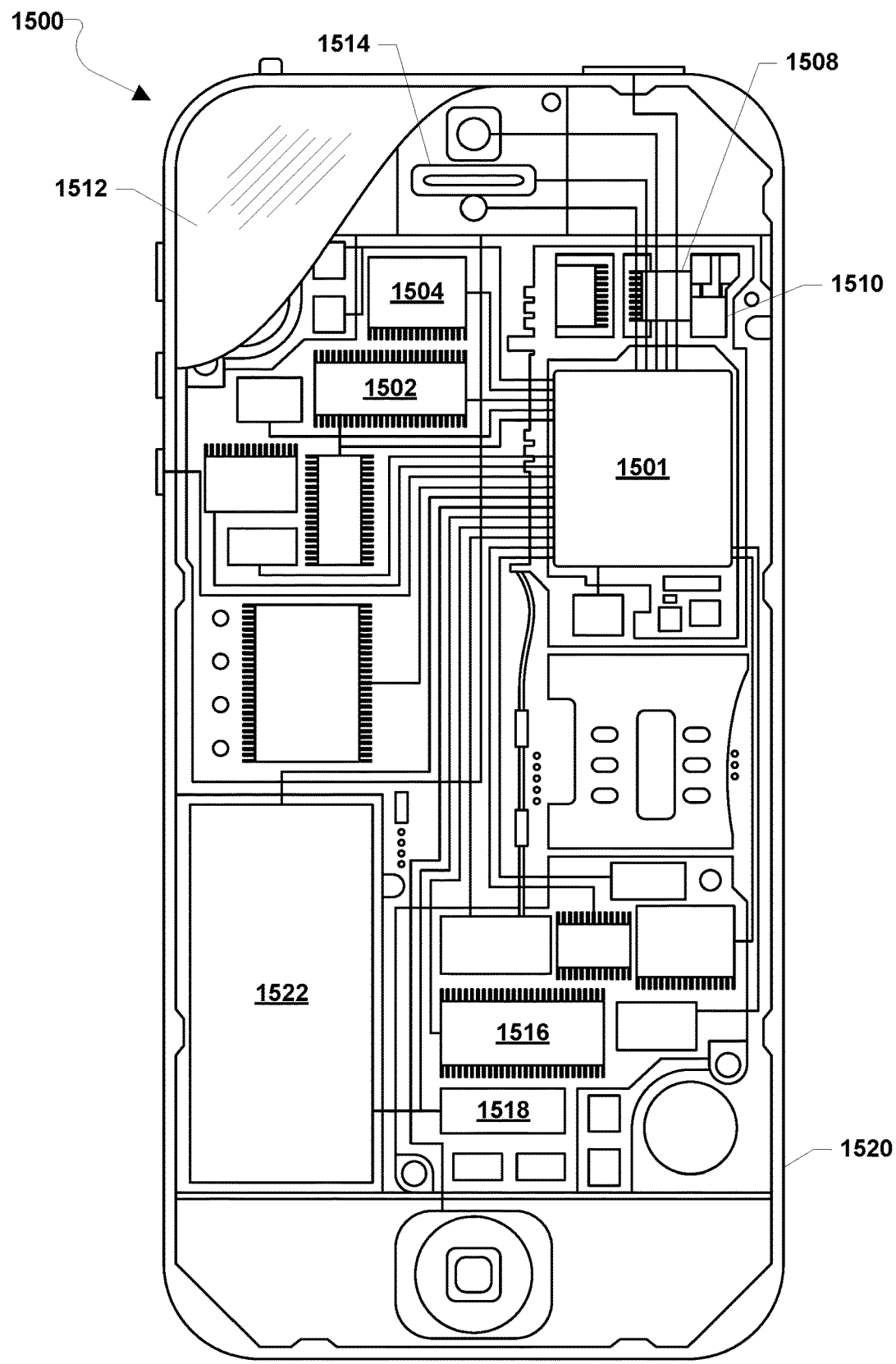
FIG. 15 is a component diagram of an example computing device suitable for use with the various embodiments.

The various embodiments (including, but not limited to, embodiments discussed above with reference to FIGS. 1-14) may be implemented in any of a variety of the computing devices (e.g., mobile devices), an example of which is illustrated in FIG. 15. For example, the mobile device 1500 may include a processor 1501 coupled to a touch screen controller 1504 and an internal memory 1502. The processor 1501 may be one or more multicore integrated circuits (ICs) designated for general or specific processing tasks. The internal memory 1502 may be volatile or non-volatile memory, and may also be secure and/or encrypted memory, or unsecure and/or unencrypted memory, or any combination thereof. The touch screen controller 1504 and the processor 1501 may also be coupled to a touch screen panel 1512, such as a resistive-sensing touch screen, capacitive-sensing touch screen, infrared sensing touch screen, etc. The mobile device 1500 may have one or more radio signal transceivers 1508 (e.g., Peanut®, Bluetooth®, Zigbee®, ANT, Wi-Fi, WiGi, V2X, RF, cellular, etc.) and antennae 1510, for sending and receiving, coupled to each other and/or to the processor 1501. The transceivers 1508 and antennae 1510 may be used with the above-mentioned circuitry to implement the various wireless transmission protocol stacks and interfaces. The mobile device 1500 may include one or more cellular network wireless modem chips 1516, such as one cellular network wireless modem chip, two cellular network wireless modem chips, three cellular network wireless modem chips, four cellular network wireless modem chips, or more than four cellular network wireless modem chips, that enables communication via one or more cellular networks (e.g., CDMA, TDMA, GSM, PCS, 3G, 4G, LTE, V2X, or any other type of cellular networks) and that are coupled to the processor 1501.

The mobile device 1500 may include a peripheral device connection interface 1518 coupled to the processor 1501. The peripheral device connection interface 1518 may be singularly configured to accept one type of connection, or multiply configured to accept various types of physical and communication connections, common or proprietary, such as USB, FireWire, Thunderbolt, Ethernet, or PCIe. The peripheral device connection interface 1518 may also be coupled to a similarly configured peripheral device connection port (not shown). The mobile device 1500 may also include speakers 1514 for providing audio outputs.

The mobile device 1500 may also include a housing 1520, constructed of a plastic, metal, or a combination of materials, for containing all or some of the components discussed herein. The mobile device 1500 may include a power source 1522 coupled to the processor 1501, such as a disposable or rechargeable battery. The rechargeable battery may also be coupled to the peripheral device connection port to receive a charging current from a source external to the mobile device 1500.

Figure 16:
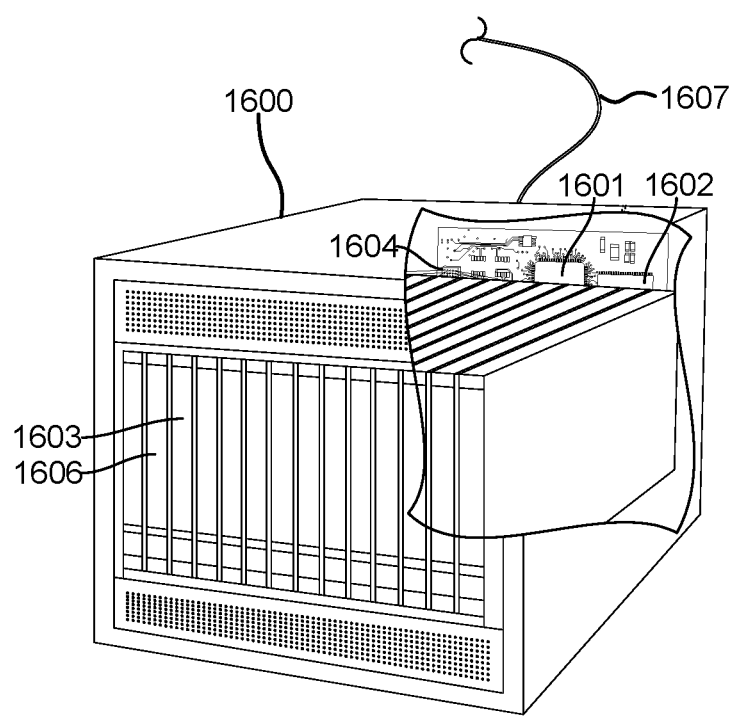
FIG. 16 is a component diagram of an example server suitable for use with the various embodiments.

The various embodiments (including, but not limited to, embodiments discussed above with reference to FIGS. 1-14) may also be implemented on any of a variety of commercially available server devices, such as the server 1600 illustrated in FIG. 16. Such a server 1600 typically includes a processor 1601 coupled to volatile memory 1602 and a large capacity nonvolatile memory, such as a disk drive 1604. The server 1600 may also include a floppy disc drive, compact disc (CD) or digital versatile disc (DVD) disc drive 1606 coupled to the processor 1601. The server 1600 may also include one or more wired or wireless network transceivers 1603, such one or more network access ports and/or wired or wireless modems (e.g., one wireless modem, two wireless modems, three wireless modems, four wireless modems, or more than four wireless modems), coupled to the processor 1601 for establishing network interface connections with one or more communication networks 1607, such as a local area network (e.g., Ethernet, etc.) coupled to other computing devices and/or servers, the Internet, the public switched telephone network, and/or one or more cellular networks (e.g., CDMA, TDMA, GSM, PCS, 3G, 4G, LTE, or any other type of cellular network).

The processors 1501 and 1601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1501 and 1601. The processors 1501 and 1601 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1501 and 1601 including internal memory or removable memory plugged into the device and memory within the processors 1501 and 1601 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes CD, laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for Internet Protocol (IP) transmission from a vehicle, comprising:
   receiving an IP packet of an overall flow of IP packets at an IP level scheduler running on a processor of an in-vehicle computing device;
   adding tracking information to the IP packet at the IP level scheduler, wherein the tracking information comprises an overall sequence number for the IP packet, a path sequence number for the IP packet, and an IP packet sender report, the IP packet sender report comprising a starting overall sequence number and an ending overall sequence number in the overall flow of IP packets; and
   sending the IP packet with the tracking information to a destination computing device.

2. The method of claim 1, wherein adding the tracking information to the IP packet at the IP level scheduler comprises adding a trailer including the tracking information.

3. The method of claim 2, further comprising updating a checksum of the IP packet in response to adding the trailer.

4. The method of claim 1, wherein adding the tracking information to the IP packet at the IP level scheduler comprises adding a header including the tracking information.

5. The method of claim 4, wherein the header is added within an IP/User Datagram Protocol (UDP) packet such that the IP/UDP packet encapsulates both the header and the IP packet.

6. The method of claim 4, wherein the header is added as part of an extended Generic Routing Encapsulation (GRE) header within an encapsulating IP packet such that the encapsulating IP packet encapsulates both the extended GRE header and the IP packet.

7. The method of claim 1, wherein the tracking information further comprises one or more of a class indicator, length indication, payload type indication, and a path identifier.

8. The method of claim 1, further comprising:
   generating a control packet including control information;
   encapsulating the control packet using a same encapsulation mechanism as used for the IP packet; and
   sending the encapsulated control packet to the destination computing device.

9. The method of claim 8, wherein the control information comprises one or more of a ping report, a sender report, and a receiver report for a path.

10. The method of claim 1, further comprising:
    receiving another IP packet including additional tracking information.

11. The method of claim 10, wherein the additional tracking information comprises a sender report including one or more of a number of sent packets on a path and sequence numbers sent on the path.

12. The method of claim 10, wherein the additional tracking information comprises a receiver report including one or more of a number of lost packets, a number of out of order packets, a Coordinated Universal Time (UTC) timestamp of a receiving time of a last received sender report, and a delay from reception of the last received sender report to generation of a current sender report at a device generating the current sender report.

13. The method of claim 1, further comprising:
    determining, in the IP level scheduler, delivery delays associated with a plurality of modems.

14. The method of claim 13, wherein the delivery delays are determined based at least in part on delivery rate estimate and queue size reporting from each of the plurality of modems.

15. The method of claim 14, wherein the delivery delays are further determined based on end-to-end delay estimates for each end-to-end delivery path originating at each modem.

16. The method of claim 13, further comprising adjusting, by the IP level scheduler, delivery rate estimates of one or more of the plurality of modems based on an end-to-end error detection mechanism.

17. The method of claim 16, wherein the end-to-end error detection mechanism is implemented at least in part using the IP packet sender report and a receiver report.

18. The method of claim 13, wherein the plurality of modems comprises three or more modems.

19. The method of claim 1, wherein the destination computing device is remote from the vehicle.

20. An in-vehicle computing device, comprising:
a processor configured with processor-executable instructions to perform operations comprising:
receiving an Internet Protocol (IP) packet of an overall flow of IP packets;
adding tracking information to the IP packet, wherein the tracking information comprises an overall sequence number for the IP packet, a path sequence number for the IP packet, and an IP packet sender report, the IP packet sender report comprising a starting overall sequence number and an ending overall sequence number in the overall flow of IP packets; and
sending the IP packet with the tracking information to a destination computing device.

21. The in-vehicle computing device of claim 20, wherein the processor is configured with processor-executable instructions to perform operations such that adding the tracking information to the IP packet comprises adding a trailer including the tracking information.

22. The in-vehicle computing device of claim 21, wherein the processor is configured with processor-executable instructions to perform operations further comprising updating a checksum of the IP packet in response to adding the trailer.

23. The in-vehicle computing device of claim 20, wherein the processor is configured with processor-executable instructions to perform operations such that adding the tracking information to the IP packet comprises adding a header including the tracking information.

24. The in-vehicle computing device of claim 20, wherein the processor is configured with processor-executable instructions to perform operations further comprising:
receiving another IP packet including additional tracking information.

25. The in-vehicle computing device of claim 20, further comprising a plurality of modems, wherein the processor is configured with processor-executable instructions to perform operations further comprising determining delivery delays associated with the plurality of modems.

26. The in-vehicle computing device of claim 25, wherein the plurality of modems comprises three or more modems.

27. The in-vehicle computing device of claim 20, wherein the processor is configured with processor-executable instructions to perform operations such that the destination computing device is remote from a vehicle in which the in-vehicle computing device is installed.

28. A non-transitory processor-readable storage medium having stored thereon processor-executable instructions configured to cause a processor of an in-vehicle computing device to perform operations comprising:
receiving an Internet Protocol (IP) packet of an overall flow of IP packets;
adding tracking information to the IP packet, wherein the tracking information comprises an overall sequence number for the IP packet, a path sequence number for the IP packet, and an IP packet sender report, the IP packet sender report comprising a starting overall sequence number and an ending overall sequence number in the overall flow of IP packets; and
sending the IP packet with the tracking information to a destination computing device.

29. An in-vehicle computing device, comprising:
means for receiving an Internet Protocol (IP) packet of an overall flow of IP packets;
means for adding tracking information to the IP packet, wherein the tracking information comprises an overall sequence number for the IP packet, a path sequence number for the IP packet, and an IP packet sender report, the IP packet sender report comprising a starting overall sequence number and an ending overall sequence number in the overall flow of IP packets; and
means for sending the IP packet with the tracking information to a destination computing device.

* * * * *